US005536558A

United States Patent [19]

Shelton

[11] Patent Number: 5,536,558

[45] Date of Patent: Jul. 16, 1996

[54] ILLUMINATED DISPLAY USING AMBIENT NATRUAL OR ARTIFICIAL LIGHT

[75] Inventor: K. David Shelton, P.O. Box 445A, R.F.D. 1, Ellsworth, Me. 04605

[73] Assignee: K. David Shelton, Trenton, Me.

[21] Appl. No.: 375,959

[22] Filed: Jan. 20, 1995

Related U.S. Application Data

[63] Continuation-in-part of Ser. No. 228,410, filed as PCT/US94/14908 filed on Dec. 23, 1994, abandoned.

[51] Int. Cl.[6] .............................. B32B 3/28; G09F 13/00

[52] U.S. Cl. .......................... 428/167; 428/134; 428/137; 428/168; 428/172; 428/213; 428/542.2; 428/913; 40/541; 40/542; 40/553; 40/584; 40/627; 156/67; 156/209; 156/219; 156/250; 264/167; 264/241; 427/64; 427/289

[58] Field of Search .................................... 428/156, 172, 428/167, 168, 13, 131, 134, 137, 138, 212, 213, 542.2, 913, 913.3; 156/67, 209, 219.25; 264/162, 167, 241, 510; 427/64, 68, 108, 123, 289; 40/541, 542, 543, 553, 584, 559, 627

[56] References Cited

U.S. PATENT DOCUMENTS

| | | | |
|---|---|---|---|
| 2,499,452 | 12/1945 | Bonnet | 359/628 |
| 3,226,865 | 1/1966 | Brand | 40/135 |
| 3,578,538 | 5/1971 | Prosser et al. | 161/6 |
| 4,424,449 | 1/1984 | O'Brill | 40/542 |
| 4,729,185 | 3/1988 | Baba | 40/546 |
| 4,766,684 | 8/1988 | Lo | 40/454 |
| 4,811,507 | 3/1989 | Blanchet | 40/546 |
| 4,888,893 | 12/1989 | Jones | 40/592 |
| 4,922,384 | 5/1990 | Torrence | 362/31 |
| 4,924,356 | 5/1990 | French et al. | 40/444 |
| 5,009,019 | 4/1991 | Erlendsson et al. | 40/511 |

*Primary Examiner*—Donald Loney
*Attorney, Agent, or Firm*—Dann, Dorfman, Herrell and Skillman

[57] ABSTRACT

A display is constructed from translucent fluorescent plastic sheet material providing an ambient light capturing and intensifying light conduit. Area dimensions are selected appropriate to a sign or other display and a thickness is selected for structural support of the display and for capturing, intensifying and conducting ambient light along the thickness of the light conduit to intensify captured light as in a wave guide. A substantially opaque reflective layer is formed on one side of the light conduit. A decorative layer is formed over the reflective layer and is selected to provide a desired sign decor. Grooves are formed in the light conduit through the reflective decorative coating in the pattern of the selected display. The grooves are formed to a depth to intercept light captured in the light conduit. The grooves provide angled surfaces which refract, capture and illuminate light out of the light conduit. Some light refracted out of the light conduit at the angled surfaces illuminates the selected grooves of the display. Grooves formed in the light conduit are of a shape to provide refraction of captured concentrated light within the light conduit and preferably substantially semicircular cross section to better simulate the effect of neon. The edges of the light conduit can also be formed with a bevel angle edge. Displays can be formed in a variety of configurations including boxes, enclosures, shades, covers, table top displays and sign displays generally. A variety of colors and aesthetic effects is achieved by incorporating other layers opposite the reflective layer into the sign structure.

92 Claims, 14 Drawing Sheets

ILLUMINATED DISPLAY USING AMBIENT NATRUAL OR ARTIFICIAL LIGHT

CROSS REFERENCE TO RELATED APPLICATION

This is a continuation in part of U.S. patent application Ser. No. 08/228,410 filed Apr. 15, 1994 and a continuation of PCT Application No. PCT/US94/14908 filed Dec. 23, 1994, now abandoned.

TECHNICAL FIELD

This invention relates to a new display structure which captures ambient light and produces an enhanced lighting effect of the display and methods of constructing such a display. The invention achieves the effect and appearance of neon light sign displays without requiring any external power supply or active electrical neon light component. The effect is achieved by capturing ambient natural or artificial light in a light conduit of translucent fluorescent material. The design is cut or molded into the thickness of the light conduit as grooves and provides angled surfaces which intercept light concentrated in the conduit and refract out some of the light which, in turn, illuminates the grooves of the design. This will happen even though the display is a passive display structure. The invention permits sign displays of levels of complexity beyond what can be achieved with active neon lighting. Optional aesthetic effects can be achieved by additional layers applied to the display structure.

BACKGROUND ART

Active electrical lighting using neon tubes became popular in the 1920's and developed into a "pop" art form in the United States. Neon lighting became widely used for advertising and sign display. Its brightness and variable color could be relied upon to attract attention. However there are now a number of disadvantages associated with active electrical neon lighting. Such active electrical lighting has fallen out of favor and is banned or closely controlled by zoning and sign ordinances in many towns, municipalities and cities. Second, there are limitations on the complexity of alphanumeric and graphic sign displays inherent in using neon tubes. Neon tubes place a limitation on the configurations that can be achieved. Finally, an active electrical power supply is always required to cause light discharge from the neon gas confined in the tubes.

In the field of passive plastic sign displays, the Prosser et al. U.S. Pat. No. 3,578,538 describes laminated indicator plaques in which a relatively thick opaque white PVC layer is laminated over a transparent PVC layer. The opaque white and transparent or translucent PVC layers are substantially the same thickness. Additional layers are formed over the opaque white layer for example a gray or black matt ink layer and a protective polyurethane lacquer layer. The overall thickness of the opaque white PVC layer and outer layers is greater than the thickness of the transparent or translucent layer.

Indicia are formed in the plaque by engraving indicia that are V-shaped in cross section. The indicia penetrate through the outer layers, namely the protective layer, ink layer, and opaque white layer but only "a little way into the transparent layer". Light from an electro-luminescent panel bonded to the transparent layer or other light source generates light which passes through the small transparent or translucent opening at the base of the V for illuminating the inner walls of the V-shaped cross section indicia. Other coloring material may be applied to the inner walls of the indicia for illumination by light passing through the small light opening at the base of the V.

It is apparent that the purpose of the laminated indicator plaques of Prosser et al. is to provide V-shaped indicia formed primarily through opaque materials. The primary appearance of the sign display is therefore imparted by the opaque surfaces of the inside of the V-shaped cross section of the indicia. The only purpose of the small penetration at the base of the V into the transparent or translucent layer is to-permit passage of light for illuminating the opaque surfaces of the insides of the grooves. As explained at column 2, lines 58–64 of the Prosser et al. patent, the penetration into the translucent or transparent layer forms only a very small fraction of the cross sectional width of the indicia namely 1/31 of the width of the indicia. To this end the V-shaped cross section grooves forming the indicia penetrate only a very small fraction of the thickness of the translucent layer. Thus the sign of Prosser et al. is basically an opaque surface sign and the limited back lighting through the apex of the V-shaped cross section angle is intended only to illuminate the opaque surfaces.

The Brand U.S. Pat. No. 3,226,865 describes another passive plastic sign structure. According to Brand an opaque material is applied across the back side of a transparent sheet. Indicia in the form of trapezoidal cross section recesses are formed through the opaque material extending into the transparent layer. A mirror or other reflective surface is then applied across and over the recesses for forward reflection of light through the recesses to the uncoated side of the transparent layer which forms the viewing side of the sign. Thus Brand requires a mirror like surface for illumination of the recesses and for illumination of the sign display.

OBJECTS OF THE INVENTION

An object of the present invention is to provide a new passive display using translucent fluorescent plastic materials, such as fluorescent acrylic sheets or molded members, as a light conduit to capture ambient natural or artificial light. The captured light is then concentrated within the light conduit, the light conducting layer, and refracted at the angled walls of grooves formed into the light conduit to achieve a visual effect similar to active electrical illuminated signs such as neon tube signs. A feature of the invention is that the fluorescent translucent light conduit uses the angled grooves forming the design to refract out of the light conduit some of the light and illuminate the angled surfaces of the grooves in desired colors and configurations with appearance similar to electrical illumination such as neon lights. However the signs are passive and no external power source is required.

Another object of the invention is to provide passive sign displays from translucent fluorescent plastic materials. Alphanumeric and graphic sign displays, for example, are themselves formed by angled surfaces of grooves formed in the translucent fluorescent plastic light conduit with any desired level of complexity in the display. An advantage of the invention is that sign displays are not limited by the configurations that can be achieved using neon tubes.

A further object of the invention is to provide passive displays using translucent fluorescent plastic materials in a variety of display configurations which may be molded into those configurations or formed using panels of plastic sheet. Examples of displays within the teaching of the present invention include enclosures, boxes, shades, covers, hangings, table top displays, and sign displays oriented for capturing ambient natural or artificial light to allow illumination of the selected sign display formed as grooves in the body of the plastic material. Another object is to provide a variety of aesthetic effects by selectively incorporating additional layers of polymer or silk screened materials into the display structure.

DISCLOSURE OF THE INVENTION

More specifically the present invention relates to a display employing a translucent fluorescent plastic light conduit. The light conduit has area dimensions selected to accommodate a display pattern and a thickness to provide structural support of the display alone or in combination with other layers or material which make up the display and to permit capturing, conducting and concentrating ambient natural or artificial light within the thickness of the light conduit. A substantially opaque reflective layer is formed on one side of the light conduit. Grooves are formed in the light conduit in the pattern of the display, the grooves being formed in the light conduit through the said substantially opaque layer. The order of formation of the grooves and the opaque reflective layer is discretionary. The grooves penetrate into the light conduit at least sufficiently far that angled surfaces of the grooves are able to intercept the ambient natural or artificial light captured within and conducted along the thickness of the light conduit. The angled surface of the groove refract out from the light conduit, light visible at the angled surfaces to illuminate the display.

The display commonly provides a sign incorporating in the displayed designs selected alphanumeric and graphic details. The display commonly incorporates a translucent fluorescent plastic sheet (FPS) as the light conduit. The area dimensions are usually selected to accommodate a sign display. Thickness is selected for structural support of the display and to permit conducting light along the thickness of the light conduit. For example, the FPS sheet commonly has a thickness of at least ⅛ inch (0.31 cm), although thinner material can be used, particularly if structural support is added by additional layers of material in a functional laminate or if a thinner layer is folded or bent into a curved configuration. A preferred range of thicknesses as used in models heretofore is from ⅛ inch (0.31 cm) to ½ inch (1.25 cm). For curved and folded displays of bendable and foldable plastics, a thinner range, i.e. 1/16 inch (0.16 cm) or even less can be used. A reflective layer is applied on one side of the FPS and should be physically bonded to prevent bubbles or areas which are non-contacting. The reflective layer is substantially opaque and is provided, for example, by white high gloss enamel, or thin white adhesive vinyl sheet. A decorative layer is usually then formed over the reflective layer, selected to provide display decor and complete opacity. The decorative layer, for example, might be specified colors of latex paint or other decorative finishes.

When fluorescent plastic sheet is used, the design grooves in the light conduit are routed, cut, or otherwise formed into the FPS in the pattern of a selected display. The grooves are formed in the FPS through the decorative and reflective layers, penetrating substantially into the thickness of the FPS. The grooves must penetrate sufficiently far that their angled walls are able to function to refract light out of the light conduit. Grooves in most situations should penetrate to at least 25% of the thickness of the light conduit thickness and the preferred range in most cases would be 50% to 75% of the thickness. A feature of the invention is that the grooves are formed with surfaces angled so as to achieve refraction of light out of the conduit to illuminate the angled walls of the grooves. How far from parallel to one surface at one extreme and perpendicular thereto as the other is a matter of design. The light conduit conducts captured ambient natural or artificial light along its thickness so that the angled surfaces intercept some of that light and refract it out of the light conduit for illuminating the sidewalls of the groove that form the display. The illuminated angled surfaces of the grooves in the light conduit constitute the display and give an enhanced lighting effect somewhat similar to neon lights.

The light conduit may also be formed by injection molding and other types of molding. Molding has the advantage that a complete display, including all sorts of non-planar configurations, can be formed in the molding step. For example, conical, tubular, oval and other complex curvatures can easily be formed. In fact, boxes and all sorts of complex curved partial enclosures can be formed as the light conduit is molded by a design configuration built into the mold. A molded structure may have one or a number of light conduit regions within a piece. Of course, when the design grooves are molded into the light conduit, instead of being cut, the light conduit comes out of the mold, perhaps in some complex shape, ready for the essentially opaque reflective layer to be applied. Care must be taken when design grooves are formed during molding that this reflective layer and the decorative coating do not flow into the grooves already molded into the surface to be coated. The reflective and decorative layers may be applied by silk screen, hot stamp or roller coating to confine application to areas to be coated, particularly on molded light conduits.

The grooves can be formed in a variety of configurations: for example, to more closely simulate neon curved or semi-circular shaped cross-section configuration. V-shaped grooves may produce a different effect. By way of example, such V-shaped grooves can be formed with sides at approximately 45° angles to the vertical. The grooves illuminated with refracted concentrated light are colored with the selected color of fluorescent tint of the FPS and have a striking similarity to excited neon tubes.

The edges of the light conduit whether molded or of fluorescent plastic sheet can also be formed with beveled or curved or other non-perpendicular edges. The beveled or curved edges are also illuminated by ambient natural or artificial light captured, conducted and concentrated along the thickness of the light conduit and refracted out of the light conduit at the beveled or curved edges, thereby illuminating the edges.

A display can be constructed, for example, of rectangular, circular, oval or polygonal configuration using fluorescent plastic sheets cut to the desired configuration. Sidewalls can also be formed with a reflective layer on one side of the FPS, preferably with a decorative layer formed over the reflective layer. Second, third, fourth, and fifth rectangular FPS panels are constructed and assembled with the first rectangular sign display panel to form a rectangular box. All or none of the sidewall panels may be fabricated as a display. The reflective and decorative layers on these panels are usually arranged to face the outside of the box and the grooves are cut or molded on outside surfaces of the box. The box is open on one side of the box opposite the first panel for capturing ambient natural or artificial light in each of the respective panels prepared as a light conductor. As a result captured light in each panel serving as a display is further refracted out and displayed at the angled surfaces, illuminating the grooves forming the selected display. Not all panels of the open rectangular box need be formed from fluorescent plastic sheets, and other materials including opaque materials can be used for some of the sides.

The box of whatever shape may be provided with a closure of appropriate shape. The closure may also be an FPS sheet with an essentially opaque reflective layer on one side and a decorative layer formed over reflective layer according to the desired sign decor. Such a closure panel may therebore provide a further display facing the opposite direction from the first. However, a source of artificial lighting must be housed in the box for generating artificial ambient light to be captured by the respective light conduit panels and refracted out at the angled surfaces of their respective grooves to illuminate the display of each panel. The panel closing the box can also be constructed from other materials, including opaque materials.

When a display is molded, the display panel may be provided with integral molded sidewalls. In such event, the whole structure normally serves as a light conduit and all surface areas on one side of the structure are treated as a unit when coatings are applied. More commonly the coated sidewalls would be the outside of the box, but as in other embodiments this can be reversed. The sidewalls may, like the face, with some complication, be molded with integral design grooves molded in the same process step, or the design grooves on the sidewalls may be separately cut into the walls through the coatings, as indeed may the grooves in the main display panel. Injection molds for such structure should also provide, insofar as possible, for uniform thickness walls, or walls that are arranged to contain and internally transmit light once captured. Thus, the integral molded structure as a whole will normally transmit light along the entire light conduit, in a manner analogous to a wave guide or optical fibre through complex curvatures and around corners. To facilitate the integral treatment of such a molded structure the intersections of sidewall panels and of front panel and sidewalls should preferably be provided with a curvature of sufficient radius which will transmit light around the corners. If sufficient radius cannot be used in a particular structure, the structure will act as several separate light conduits. In the situation where a closure is provided for an injection molded box display, it will probably be difficult and expensive to mold the closure in one piece with the rest of the box. Therefore, a separate molded or sheet closure, either of translucent fluorescent plastic, prepared for a display panel, or not, as desired, or any other opaque material, may be used in essentially the same manner as with the box formed of sheet panels. Of course, as in the other closure structure, a light bulb or other source of internal lighting may be supplied to provide artificial ambient lighting to be captured by the panels.

According to another aspect of the invention, first and second display panels constructed from first and second fluorescent plastic sheets or molded pieces prepared with reflective coatings and grooved displays can be arranged back to back, spaced apart from each other. Spacing brackets space the signs apart to allow capturing of ambient natural or artificial light between the signs. The displays normally will be oriented with the grooves facing outward so that light refracted at the angled surfaces of the outward facing grooves illuminate the grooves and the reflective substantially opaque coating blocks other light. Alternatively, the displays can be oriented with the grooves facing inward and the coating can be placed inside so that light received and refracted at the grooves is reflected back through the thickness of the light conduit at an angle which will pass most of the reflected light out of the uncoated side but also cause diffusion of some of the reflected light thereby forming a halo effect around the displays.

In another example embodiment of the invention a clear polymer layer is formed over the decorative layer, filling the grooves, to form a substantially smooth surface. The clear polymer layer introduces a halo effect from some of the light refracted at the grooves but reflected and diffused through the clear polymer layer.

Other aesthetic effects are achieved in further embodiments. Multicolor sign panels can be prepared by selectively applying translucent tinted or dyed inks, paints, vinyl or polymer to the side of the display panel opposite the grooves. For example, a layer of silk screened translucent fluorescent ink selected color can be applied only to the back of selected letters for coloring those letters that color. Other areas may be tinted in other colors applied to the back of other letters for multicolored letters or similarly applied to selected portions of a graphic design. These color effects can be achieved also by the application of silk screened color translucent tinted or dyed polymers or paints. Display grooves backed by the tinted polymer assume a new color, while grooves without the tinted backing layer exhibit the color of the original fluorescent acrylic sheet. The color effects may be facilitated or improved by using light conduit of white, clear or very light pastel tint fluorescent plastic. The fluorescent plastic appears to enhance the light capturing qualities of the light conduit. Another example of special effects is the use of a grating to produce patterned prismatic effects. Prismatic patterns can be achieved by applying conventional light diffuser panels to the side of the display panel opposite the design grooves.

An advantage of the display structure according to the invention is that either side of the display can be constructed and used as the viewer side of the display. If the grooves are positioned so that the grooved side of the display faces away from the viewers, there is a halo effect of light refracted and displayed at the angled surfaces of the grooves reflected back through and out of the thickness of the fluorescent light conduit as well as some of that light being diffused within the conduit and even at the halo.

The invention also provides a new method of forming a passive display structure with the appearance of active electrical neon lighting. The method contemplates forming a fluorescent tinted plastic light conductor having area dimensions selected to accommodate a display pattern and a thickness to provide structural support of the display and to permit capturing, conducting and concentrating ambient natural or artificial light within the thickness of the light conduit. One method forms grooves in the light conduit in the pattern of the display following or during the formation of the light conduit as by injection molding. Another saves the groove forming step for later. Either way the method includes a step of coating a substantially opaque reflective layer on one side of the light conduit. In preferred structures this reflective coating is covered by coating a decorative layer over the reflective layer to provide a desired sign decor. If the grooves forming the design are done first as in molding, the coatings avoid filling the grooves. If grooves have not been molded before application of coatings, the grooves are then cut in the light conduit in the pattern of the display, as by routing, cutting through the decorative and reflective layers and penetrating into the light conduit at least sufficiently far that angled surfaces of the grooves intercept light captured within and conducted along the thickness of the light conduit. The grooves refract out of the light conduit light visible at the angled surfaces to illuminate the display.

Other objects, features and advantages of the invention are apparent in the following specification and accompanying drawings.

DESCRIPTION OF PREFERRED EXAMPLE EMBODIMENTS AND BEST MODE OF THE INVENTION

Figure 1:
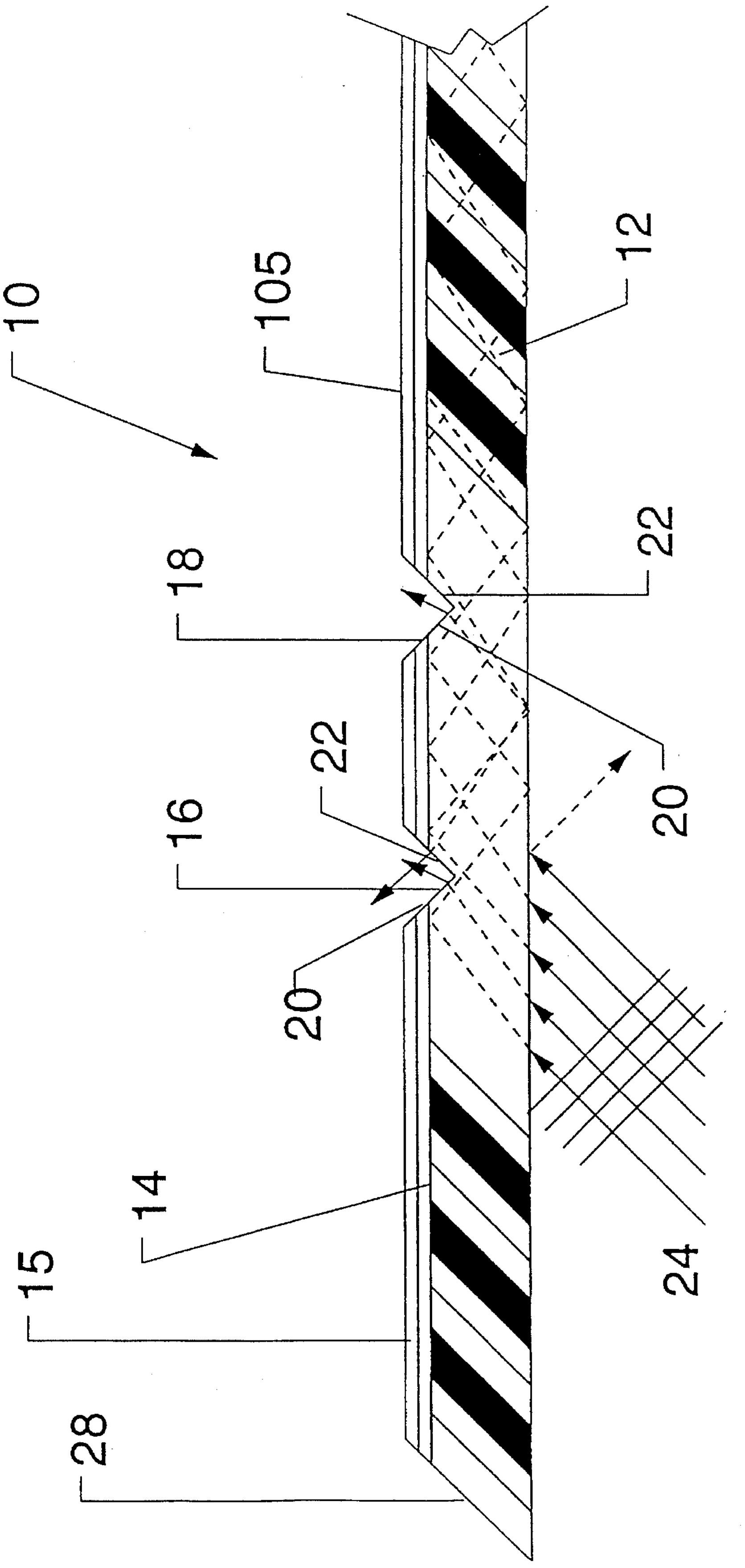
FIG. 1 is a fragmentary cross sectional view at a beveled edge through a portion of a light conduit and coating layers of a display structure according to the invention employing grooves of V-shaped cross section.

A basic sign structure 10, the basic display according to the invention is illustrated in FIG. 1. The primary component of the sign is a light conductor 12 formed from a fluorescent dye tinted plastic sheet, such as a fluorescent acrylic sheet. Such fluorescent acrylic sheets are available for example under the trademarks ACRYLITE (TM) manufactured by Acrylon Co., PLEXIGLASS (TM) manufactured by Rohm and Haas, LUCITE (TM) manufactured by DuPont etc. The originally transparent acrylic polymer is tinted with fluorescent dyes to form effectively translucent sheets in a variety of hues and colors including red, orange, yellow, green, gold, blue, etc. The thickness of the sheet is selected to capture ambient light to provide a light conduit and with a sufficient thickness to provide the necessary structural support for the display. Generally the translucent fluorescent plastic sheet (FPS) 12 is selected with a thickness of at least ⅛ inch (0.3 cm) to retain the necessary structural strength to support the sign after the grooves are cut as hereafter described. It has been found that a preferred thickness adapted for sign displays is ¼ inch (0.6 cm). The usable thickness of the sheet is determined by its ability to perform as a light conduit to capture and retain ambient light. At substantially greater thicknesses than ½ inch (1.25 cm), the optical effects described herein are not as effective including the capture, concentration and conduction of light along the thickness of the light conduit and refraction of light at the angled surfaces to illuminate the display. For curved and folded signs much thinner thicknesses can be used, for example, on the order of 1/16 (0.16 cm) or less.

On one side of the light conduit 12, a substantially opaque reflective layer 14, such as a thin white enamel layer of an oil based enamel, is applied for example by painting or spraying. Adherence or physical bonding to the surface is important to achieve a uniformly reflecting surface. Other materials can be employed to achieve the substantially opaque reflecting surface, however. For example, a white vinyl layer can alternatively be adhered to the surface of the light conduit 12. A white reflective layer 14 provides an ideal reflective surface for capturing and conducting light along the thickness of the light conduit. White is preferred as a color because it forms a neutral background color not modifying the selected fluorescent translucent color of the light conduit 12.

A decorative layer 15 is formed over the reflective layer 14 to impart the desired sign decor. The decorative layer 15 can be for example a latex paint layer applied by painting or spraying. The decorative layer 15 can provide the desired pattern, color or other surface effect such as marbling, simulation of wood surfaces, etc.

The actual design of the display, such as alphanumeric indicia and graphic configurations of a sign are then formed in the fluorescent plastic light conduit 12 by cutting grooves 16,18 for example by routing or drilling through the decorative and reflective layers 15,14 and penetrating substantially into the light conduit 12 sufficiently to intercept light transmitted therein. Examples of such alphanumeric and graphic display sign configurations are hereafter described with reference to FIGS. 4–7. For example alphanumeric characters ray be presented by single grooves or e.g. double grooves 16,18 as shown in FIG. 1.

Figure 12:
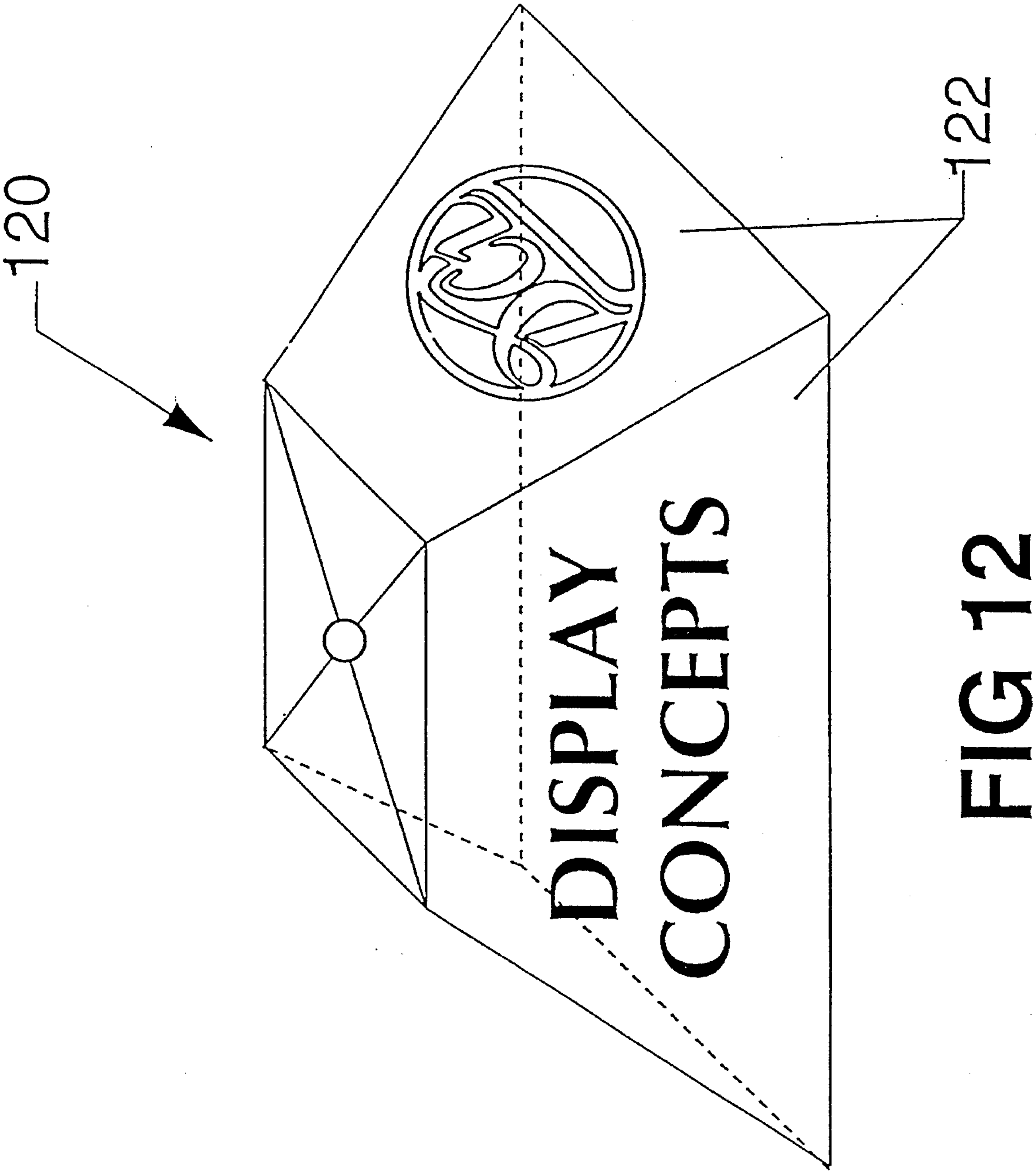
FIG. 12 is a side perspective view of a display lampshade according to the invention.

In the preferred example of FIG. 1 the grooves 16,18 are cut or routed in a V-shaped cross section configuration. The grooves must penetrate deep enough to intercept light captured into the light conduit 12. Angled sidewalls of the grooves must be at an angle to light in the conduit to refract out some of that light. For example, with the sides of the grooves formed at an angle of approximately 45° with respect to a vertical plane bisecting the V-shaped groove. As shown in FIG. 12 the grooves must penetrate a sufficient distance into the fluorescent plastic light conduit to intercept sufficient light to achieve a good display. A good effect is achieved by grooves which penetrate approximately 50% of the thickness of the sheet. As a result of interception, light is refracted out at the groove sidewalls 20 and 22 and illuminates those sidewalls for enhanced visual presentation of the alphanumeric characters and graphic figures at the surfaces of the sidewalls of the grooves.

While the grooves 16,18 of the example of FIG. 1 penetrate approximately ⅓ of the thickness of the light conduit 12, the grooves may penetrate in a preferred range, for example, from 25% to 75% of the thickness of the fluorescent plastic sheet. Further penetrations, while optically effective, may structurally weaken the light conduit to a point where it is easily broken. The practical limitation on the overall depth of the groove, therefore, is to assure sufficient material of the FPS behind the groove to provide the necessary structural support for the display. On the other hand, the limitation at the shallow end of the range is to assure that the grooves intercept enough light to provide the desired optical effects of the sign display.

As shown in FIG. 1 ambient light 24, either natural or artificial, is captured or trapped in the fluorescent plastic light conduit 12 which acts as a wave guide capturing, conducting and concentrating the light by internal reflection. The concentrated or intensified ambient light 24 is then intercepted, refracted and transmitted through and illuminates the angled surfaces 20,22 of the grooves 16,18. Restricting release of the captured concentrated light to these limited concentrated areas gives the appearance of active illumination such as occurs with electrically stimulated neon tubes. The enhanced illumination of the display structure 10 is actuated passively, however, solely by response to ambient natural light or adjacent artificial light sources. The light emitted at the angled surfaces 20,22 can be greatly intensified by adjacent sources of light. Movement of the light conduit relative to sources of ambient light can enhance the capture of the ambient light and intensify the display effect.

As shown in FIG. 1 the edges of the sign 10 can be cut with bevel angle edges 28 which intercept, refract and, similarly to the angled walls of design grooves, transmit concentrated light captured by the light conduit 12 so as to illuminate those edges. It is noted that the edges may be curved concave or curvex to achieve edge illumination, but the simple bevel cut will normally produce more illumination. Also, it has been known that the square edges of FPS emit some light, but the enhancement of the angled surfaces is substantial and can be viewed from the front of the display which squared edges perpendicular to the surface of a flat sheet cannot be. The overall effect is to provide a sign display of alphanumeric and graphic figures surrounded by a border all of which consist of angled surfaces formed in the fluorescent plastic sheet. All of the angled surfaces emit concentrated light captured within the thickness of the light conduit, which functions as a planar wave guide. It is noted that the alphanumeric and graphic characters of a sign display are presented entirely by the angled surfaces cut and formed in the fluorescent plastic light conduit. The decorative layer 15 forms the background or border decor around the alphanumeric and graphic figures.

Figure 2:
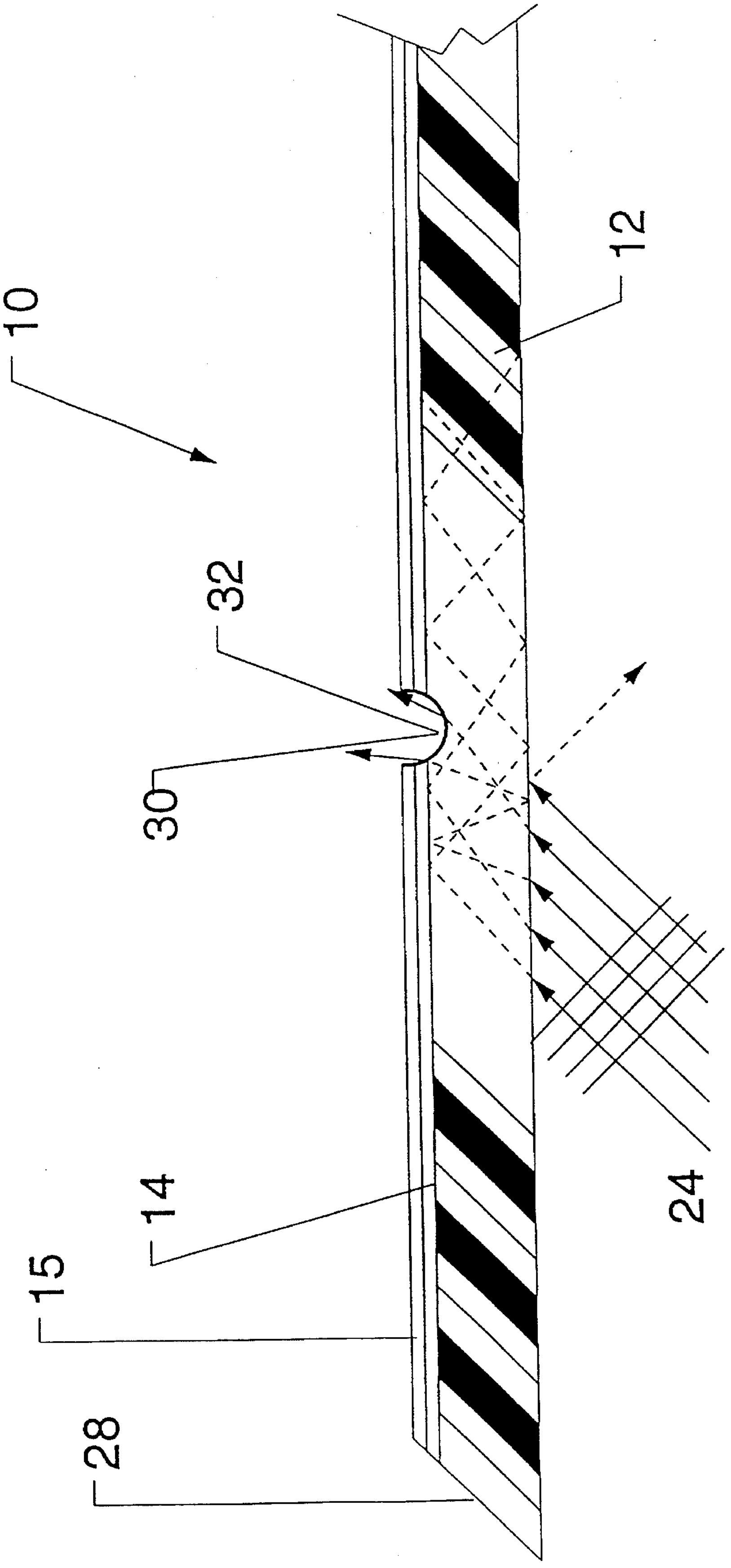
FIG. 2 is a fragmentary cross section view similar to FIG. 1 through a portion of a light conduit and coating layers of a display structure employing grooves of semicircular cross section.

According to an alternative embodiment shown in FIG. 2, the sign display structure 10 is constructed with grooves 30 which provide curved sidewalls, here of semicircular configuration. For proper effect the semicircular grooves 30 must extend into the light conduit sufficiently far to intercept captured light within the thickness of the optical conduit. While shown extending only 25–30% into the conduct, grooves may extend more than halfway through the thickness of the light conduit 12 with improved effect. The inside of the groove 30 is formed by angled surfaces 32 of variably changing angle according to the semicircular configuration. Concentrated light captured in the planar wave guide of the light conduit 12 are similarly emitted with concentrated intensity through the angled surfaces 32 with a startling result involving more or less refraction out of the light conduit at different levels in the grooves. The semicircular configuration of the grooves gives the striking appearance of neon tubes of similar size and circular configuration.

Figure 3:
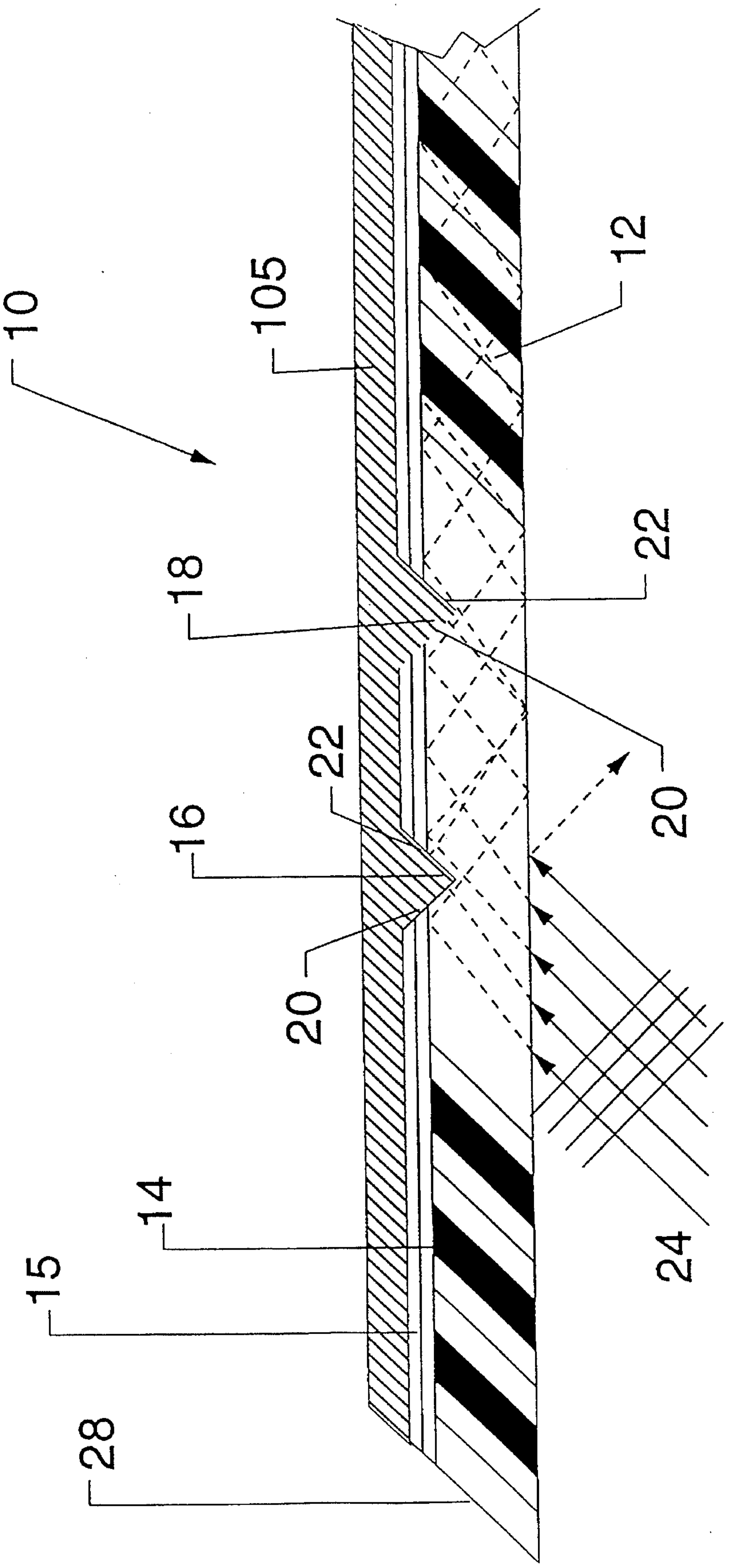
FIG. 3 is a fragmentary cross sectional view through a portion of another display structure with an outer clear polymer, layer for introducing a halo effect.

A further feature of the invention is illustrated in the sign structure 10*a* of FIG. 3. The display structure 10*a* is similar to the display structure 10 of FIGS. 1 and 2. It employs a light conduit 12 constructed from a fluorescent plastic sheet coated on one side with a reflective layer 14 and decorative layer 15. Grooves 16,18 are similarly formed through the decorative and reflective layers 15,14 and penetrate the light conduit 12 a sufficient distance that the angled surfaces forming the alphanumeric and graphic sign display will intercept captured light. In the sign construction 10*a* of FIG. 3 a further clear polymer layer 34 is coated over the decorative layer filling the grooves 16,18 to form a smooth surface over the sign.

A feature of the sign structure 10*a* is that ambient light captured in the planar wave guide formed by light conduit 12 and concentrated, refracted and transmitted through the angled surfaces 20,22 is also partially transmitted through and partially diffused within the clear polymer layer 34. Thus, the refracted light forms a halo effect around the primary illuminated angled surfaces constituting the alphanumeric and graphic figures of the sign display. The halo effect can be varied with the intensity of the ambient light and with the thickness of the clear polymer layer 34. A preferred range of thickness for the clear polymer layer 34 over the decorative surface is 2–6 mm and typically 3 mm.

A clear polymer suitable for use in forming the layer 34 is for example KRAFTKOTE (TM) clear polymer coating with ultraviolet inhibitor manufactured and available from Klockit Company, P.O. Box 636, Lake Geneva, Wis. 53147. The clear polymer layer 34 leaves a crystal clear finish of desired thickness that forms the halo effect viewing the sign from the same side as the grooves.

A similar effect but even more dramatic can be obtained by using the exposed side of the light conduit 12 as the front of the sign. With the grooves appropriately inscribed in reverse or in mirror image the sign can then be viewed from the exposed side of the fluorescent plastic sheet 12. The concentrated light transmitted through and refracted at the angled surfaces 20,22 so that it becomes visible is similarly partially diffused and dispersed through the thickness of the light conduit 12 forming a dramatic halo effect or double image of the alphanumeric and graphic figures inscribed by the grooves. The bevel edges 28 of the grooves similarly form an illuminated boundary of concentrated light from either side of the sign.

Figure 4:
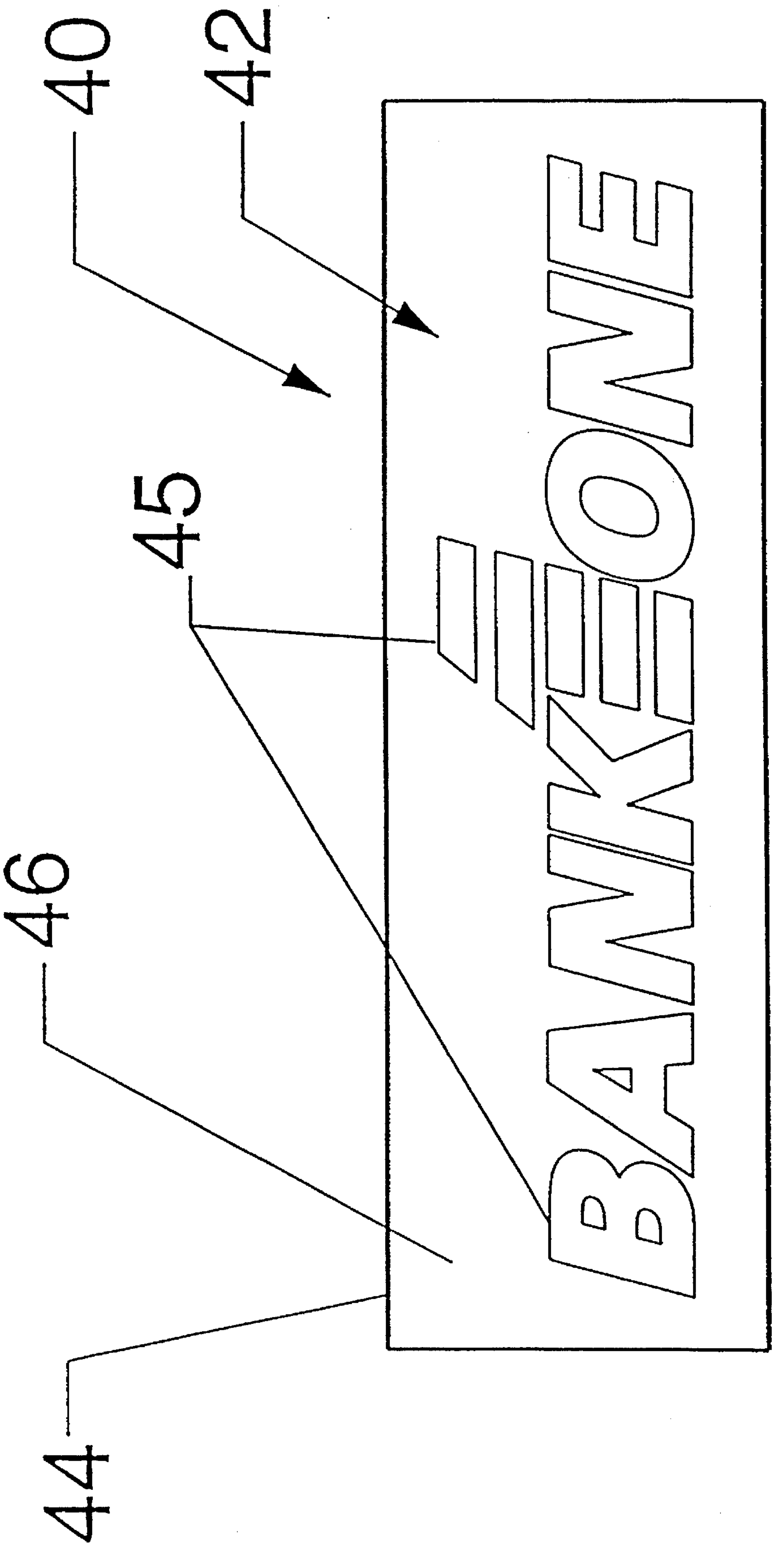
FIG. 4 is a front or plan view looking directly at a display structure constructed from a single fluorescent plastic sheet.

A plan view of a simple hanging sign structure 40 incorporating any of the features described above in connection with FIGS. 1, 2 and 3 is illustrated in FIG. 4. The sign 40 is constructed from a single rectangular sheet 42 of translucent fluorescent acrylic sheet tinted, for example, with a yellow or green fluorescent dye. The fluorescent plastic sheet is, for example, ¼ inch (0.6 cm) in thickness and is cut with approximately 45° bevel angle edges 44 which provide a passively lighted border around the sign.

Each of the lines 45 shown in FIG. 4 depicting the alphanumeric indicia and graphic logo or design represent in actuality V-shaped grooves routed into the FPS 42 through a decorative layer 46 formed over a white enamel reflective layer (not visible). The V-shaped grooves penetrate into the FPS 42, for example, ⅛ inch (0.3 cm), approximately 50% of the thickness of the sheet.

The sign 40 of FIG. 4 is suitable for hanging by hangers 48 at a variety of locations with back lighting by ambient natural light from windows or skylights or from artificial light sources. Such hanging signs are useful, for example, for directional signs, aisle markers, and business names for both indoor and outdoor use.

Figure 5:
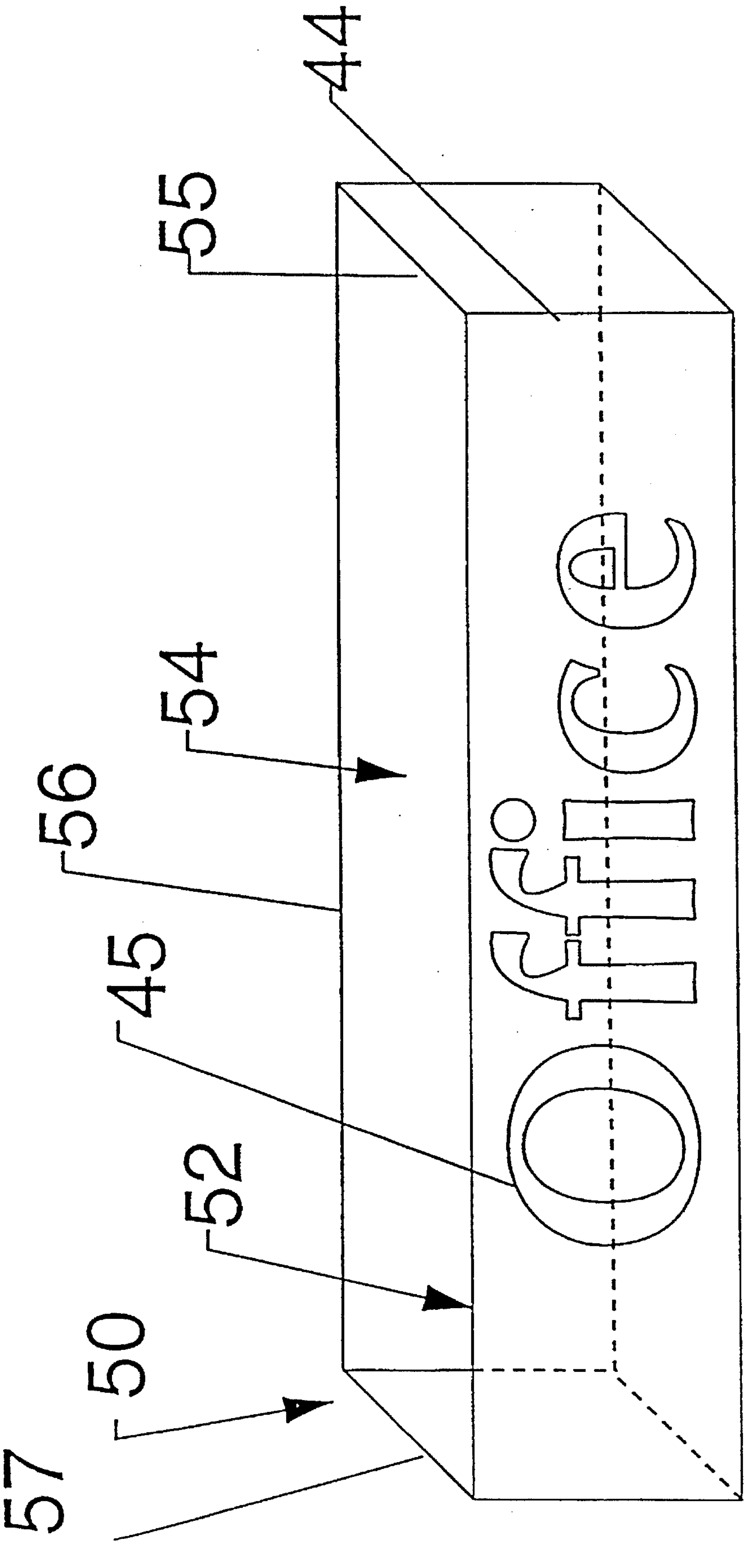
FIG. 5 is a perspective view of a sign structure in the configuration of a rectangular box with an open side for capturing ambient light.

A display structure 50 in the configuration of an open rectangular box is illustrated in FIG. 5. A sign panel 52 using fluorescent plastic sheet similar to the sign 40 of FIG. 4 is incorporated into the box structure. In this example the sign panel is a side wall panel of the box adjacent to the open side 54 normally arranged at the top of the box. Additional fluorescent plastic sheet panels 55,56,57 as well as a fifth plastic sheet panel forming the bottom of the box (not visible) are assembled together, for example, by glue or adhesive to complete the box sign 50. The FPS panels 55,56,57 can be constructed in the same manner as the sign face 52 and be formed with or without grooves for sign display. All of the fluorescent plastic sheet panels in this example may be tinted, e.g., with a red or pink fluorescent dye. The open side 54 at the top of the box permits entry and capture of ambient light for illumination of each of the angled surface of grooves to provide the design outline 45 formed by the grooves penetrating into the light conduit. The beveled angle edges 44 can be used in the box sign construction to provide the passively illuminated border of concentrated ambient light.

Each of the FPS panels 55,56,57 can be constructed in the same manner as the sign 52 with the light conduit coated with a substantially opaque white enamel reflective layer and overlying decorative layer facing outward. Each of the panels 55,56,57 can also be formed with bevel angle edges exposed in a slightly modified box construction. All of the edges of the vertical panels of the box in such construction are therefore passively illuminated by concentrated ambient light. Light enters the open side 54 of the box sign 50 and is captured in each of the light conduit panels. The light conduits in each case provide planar wave guides to direct light along the panel thickness to the angled surfaces. In some forms of box construction the light conduits may be connected to one another in such a way as to permit transmittal of light to each other for reinforcing the illumination of any alphanumeric and graphic display grooves 45 of the sign 52.

Figure 6:
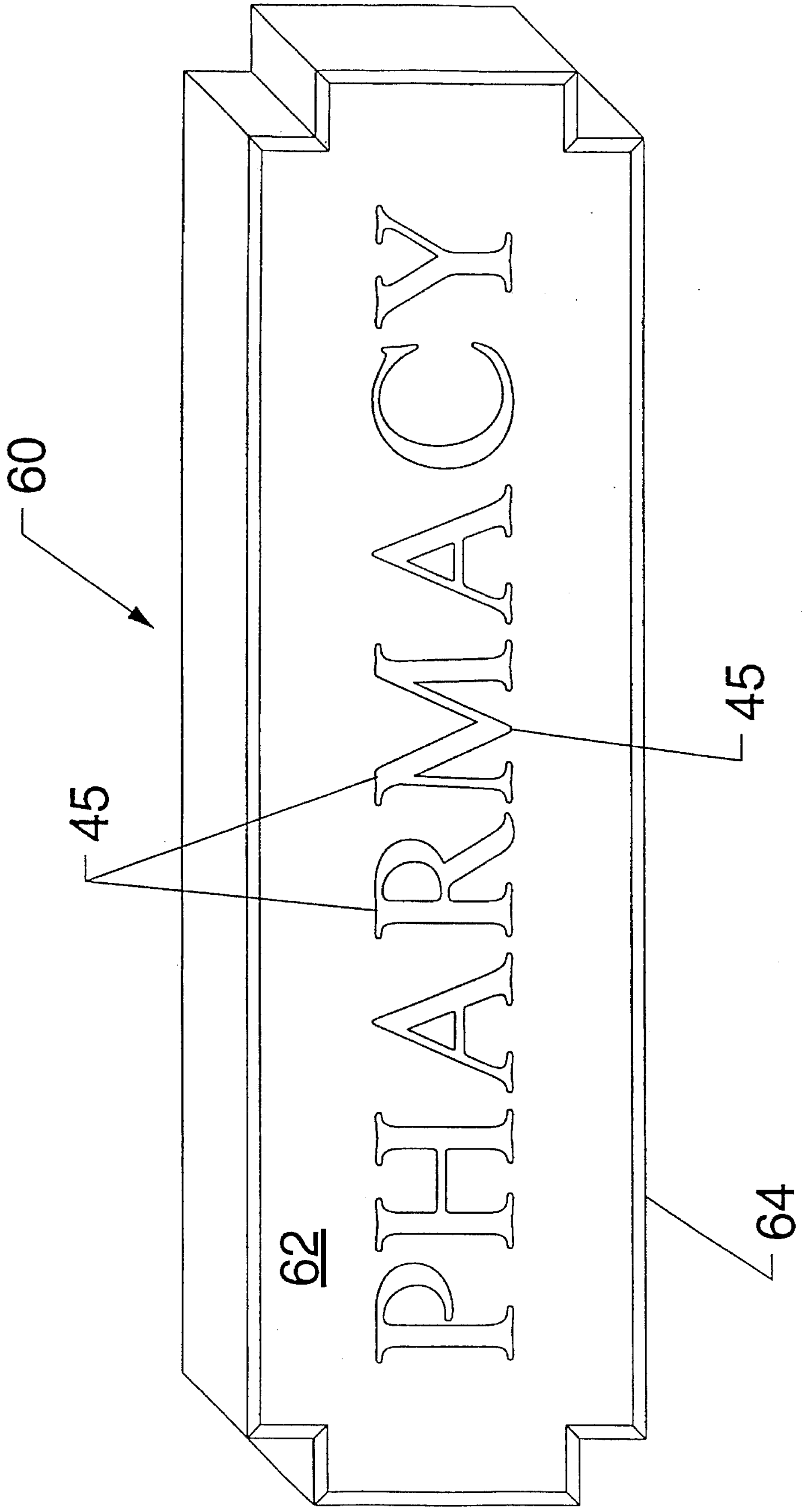
FIG. 6 is a side elevation view of a box sign display in perspective provided with a substantially rectangular enclosure and with an artificial light source housed within the enclosure.

A fully enclosed sign 60 in the substantial configuration of a rectangular box is illustrated in FIG. 6. In this example the vertical sign face 62 provided by a panel of FPS as a light conduit forms the front side of a the display and is surrounded except at its open top by panels fixed to one another and along three edges of the sign face as box sidewalls. The sign face 62 is constructed in the manner similar to sign 40 of FIG. 4 or sign face 52 of FIG. 5. The depth of the grooves along lines 45 can be selected at an appropriate depth to expose the desired angled surfaces formed by grooves in the translucent FPS to capture light within the light conduit for illumination of the grooves providing the sign display. For example, the depth of penetration may be in the range of 25%–75% of the thickness of the panel without unduly weakening the structure. A beveled angle edge 64 is provided around the border of the sign face 62.

Not all sides of the fully enclosed sign 60 need be constructed from the fluorescent acrylic panels. The back side (not visible) is in fact preferably constructed from an opaque backing material such as wood, metal, plastic, etc., in many instances. Where the joints of the rectangular enclosure are intended to be illuminated at beveled edges, then FPS's, or other fluorescent light conduit means, are used.

As shown in FIG. 6, and previously in FIGS. 4 & 5, each of the alphanumeric indicia may be inscribed with double grooves, often with constant spacing of the double grooves in the sign 40 of FIG. 4 or alternatively with variable spacing of the double grooves in the sign faces 52,62 of FIGS. 5 and 6 to achieve different font presentations. Thus the sign display of FIG. 6 is presented in a more formal typeface or font. The decorative layer 6 on the outside of the sign face 62 can be for example, a marble finish achieved by "marbling" the latex paint applied to the surface. Light for capture in the planar wave guide light conduit of the FPS panels is provided by an artificial source of light such as a standard fluorescent light housed within the closed rectangular box enclosure and not visible in FIG. 6 or from other view points outside of the display.

Figure 7:
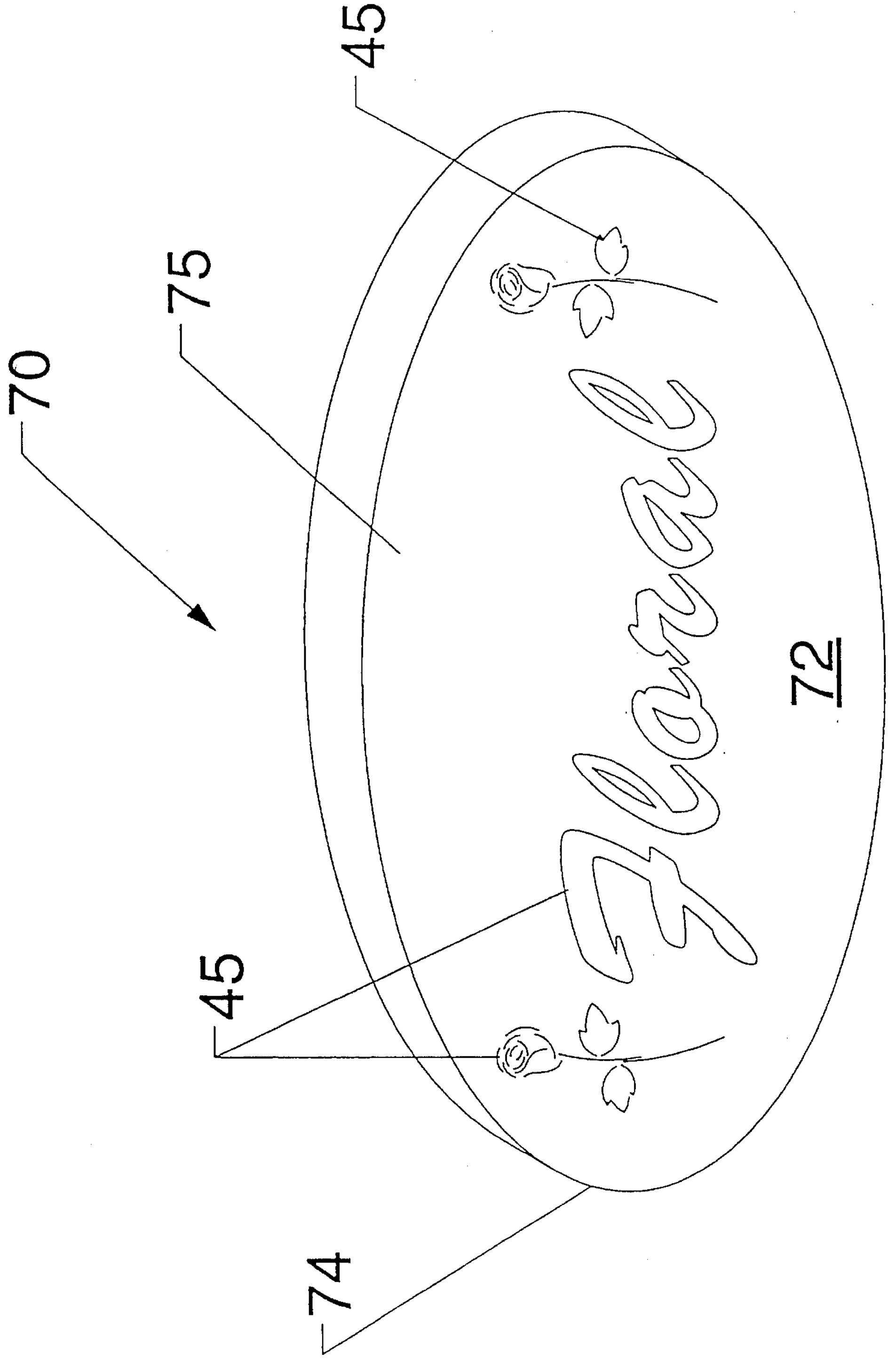
FIG. 7 is a side elevation view of another box sign display in perspective of sign structure with oval cylindrical enclosure sidewalls also housing an artificial light source.

Another box sign enclosure 70 of oval configuration is illustrated in FIG. 7. The construction of the sign face 72 is similar to the sign faces 52,62 of FIGS. 5 and 6 and the hanging sign 40 of FIG. 4 except for the oval configuration. A beveled edge 74 may provide a passively lighted border of the oval shape defined by and surrounding the sign face 52. All of the lines 45 of the designs will be understood to represent grooves routed or cut through decorative and reflective layers into the fluorescent plastic sheet as heretofore described or molded into the injection molded light conduit as hereafter described. In the example of FIG. 7, the FPS may be selected with a pink fluorescent dye and the decorative layer 75 applied with green latex paint, for example.

In each of the examples of FIGS. 6 and 7, the enclosure walls assembled to the edges of the sign face or principal display may themselves be prepared from fluorescent plastic sheets or from other materials including opaque materials such as structural foams, fiberglass, etc. The sign faces and enclosures can be prepared as well in any of a variety of configurations.

Each of the signs and sign faces illustrated by way of example in FIGS. 1–7 has the advantage of being usable as a sign display from either side of the fluorescent plastic sheet with very different appearances. According to the orientation of the sign faces described with reference to FIGS. 1–7 the sign is normally viewed from the side bearing the decorative layer 15, the side through which the grooves 16,18 are routed, cut or molded. In this orientation the translucent faces of the grooves glow with an illumination achieved by concentrated light captured in the light conduit, effectively a planar wave guide of the fluorescent plastic sheet or other molded light conduit and exiting through the angled surfaces of the design cut or molded into the light conduit. The rest of-the sign face is not passively illuminated and merely bears the color of the opaque material or decorative layer coating. In this orientation the sign display can have the appearance of active neon lighting achieved, however, by passive captured concentrated light illumination.

The signs, however, can also be viewed from the other side, the side away from the grooves where the surface of the fluorescent plastic sheet panel is exposed. From this side of the sign the angled surfaces of the grooves are similarly illuminated but some of the light is refracted and diffused internally of the light conduit as it passes through the thickness of the FPS or other light conduit toward the viewer. This refracted and disbursed light is reflected from the illuminated angled surfaces of the grooves at angles that prevent its immediate escape but allow random escape, after internal reflections, forming a halo effect, or double image from light spreading internally in the light conduit from the angled surfaces of the grooves. This halo effect can provide a striking and pleasing image when viewed from the exposed side of the fluorescent plastic sheet. In some applications and contexts this may be the desirable side of the sign to use for the light conduit display.

Since the grooves are viewed from the opposite side of the sign's opaque reflective layer, the grooves must be cut in a reverse or mirror image configuration of the final design display to be viewed through the thickness of the light conduit fluorescent plastic sheet. For a symmetrical graphic design, the same pattern can be viewed from both sides presenting the same image but with significantly different effects on the opposite sides of the sign.

Figure 8:
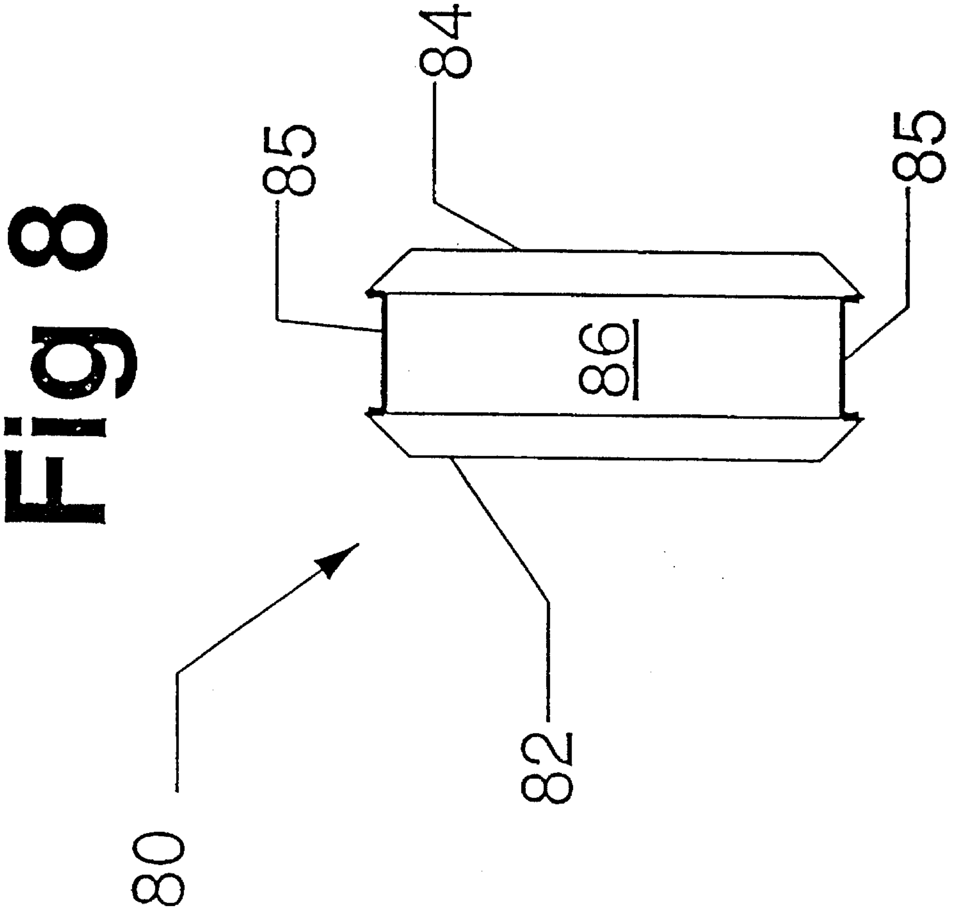
FIG. 8 is a side view of a display employing a pair of signs spaced apart for capturing ambient light between the signs and with the grooves of each sign facing outward.

As shown in the double sign structure 80 of FIG. 8 a pair of signs 82,84, each prepared in the configuration of the signs, for example, of FIGS. 1 and 4 are placed back to back, spaced apart and rigidly secured together by brackets 85. In this example the sides of the signs bearing the decorative layer 15 through which the grooves are formed face outwardly forming the sign face for viewing. The sign structure 80 of FIG. 8 can be used for example as a hanging sign for viewing from either side. Ambient light is captured in the space 86 provided between the signs 82,84 for capture of light in the respective light conduits.

Figure 9:
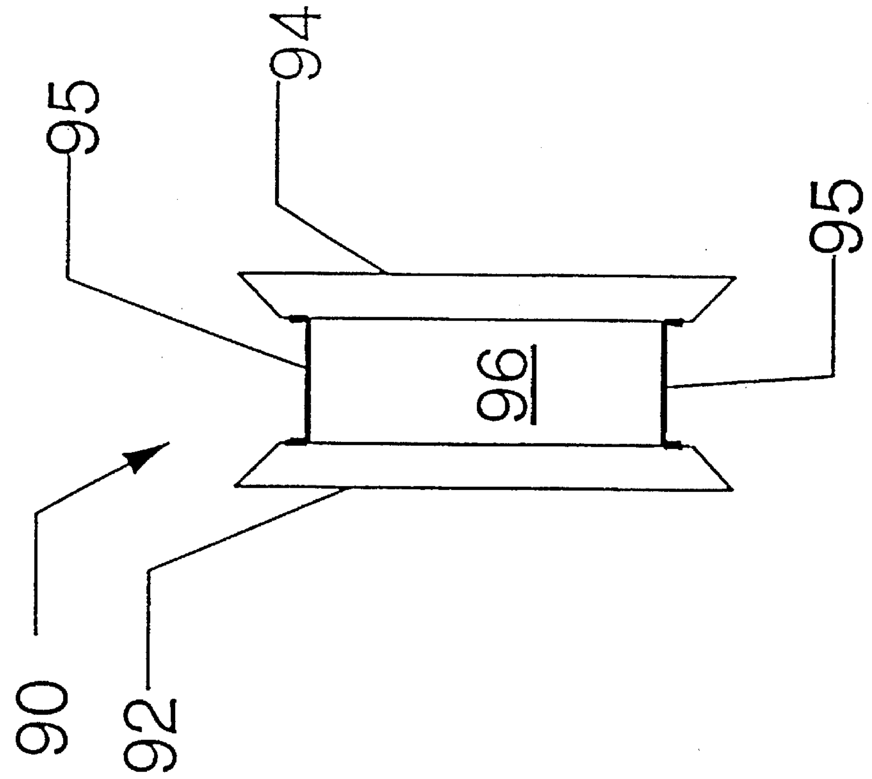
FIG. 9 is a side view of a display employing a pair of signs spaced apart for capturing ambient light between the signs and with the grooves facing inward to create a halo effect around the display grooves when viewed from the outside looking through the light conduits.

In the example of FIG. 9 another-double sign structure 90 is constructed with the signs 92,94 facing in the opposite directions. That is, the side of the signs 92,94 bearing the decorative layer through which the grooves are formed face inwardly, while the exposed sides of the fluorescent plastic sheet panels face outwardly. The double signs 92,94 are similarly spaced apart and rigidly secured together by brackets 95 leaving ample space 96 for ambient light to be captured within each of the light conduits. In this example ambient light is also captured from the outside in the planar wave guides of the fluorescent plastic sheet panels. The intensified light is intercepted by the angled surfaces of the grooves. Light passing through the angled surfaces of the grooves is in part reflected back into and through the light conduit and diffused as it passes through the thickness of the light conduit forming the halo effect around the alphanumeric and graphic indicia of the sign display.

Figure 10:
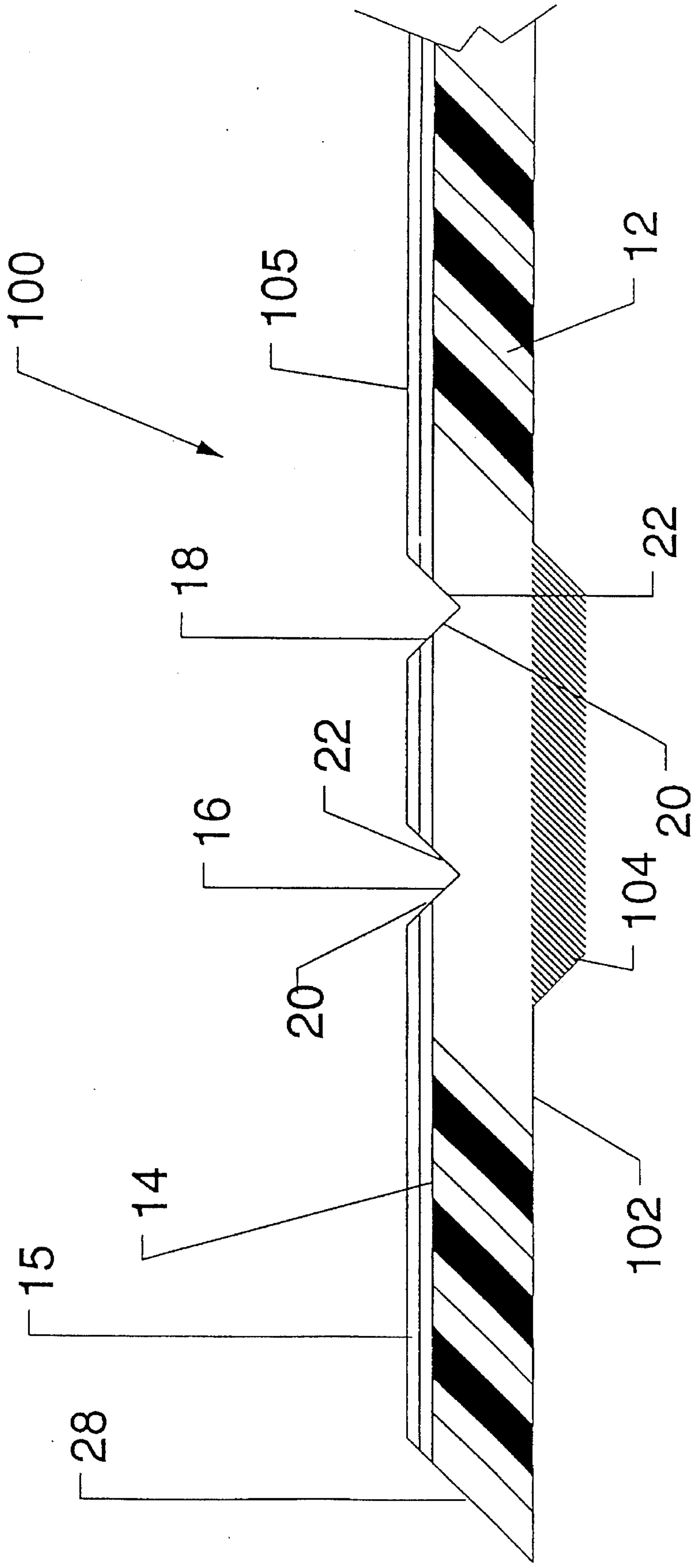
FIG. 10 is a fragmentary cross sectional view through a portion of a light conduit and coating layers of a display structure showing a partial translucent tinted polymer layer of a selected color employed over only a portion of the display on the opposite side of the light conduit from the other coatings for changing a portion of the display opposite the coated area to that color.

An element of a multicolor sign panel structure 100 according to the invention is illustrated in FIG. 10. The display panel of FIG. 10 is similar to the design panel of FIG. 1 and corresponding elements are indicated by the same reference numerals. In addition there is applied on the back side 102, opposite the reflective coating 114 of the display panel 100, in selected regions of layer 104 various patches of clear polymer tinted with a selected dyes or other coloring means so that a translucent layer 104 is a patchwork of various colors different from the color of the fluorescent plastic sheet 12. The tinted translucent polymer layer 104 need be applied only to selected portions of the design 102 behind various portions of the design, for example, opposite selected letters or graphic portions of the sign display to be colored. In this way a multicolored design, such as one in which individual letters and selected portions of graphics are seen in different selected colors from the grooved side 105 of the light conduit panel 100.

Thus a choice exists so that a variety of different colored patches can be applied in layer 104 to the design panel 100, for example, behind different letters and graphic figures, or the color of the light conduit can be used for all or selected portions in layer 104. The tinted dye or color selected for mixture with the clear polymer to form the tinted translucent layer 104 can dominate the color of the fluorescent acrylic sheet 12 or combine with it to form a third color for light displayed in each selected portion of the grooves.

Figure 11:
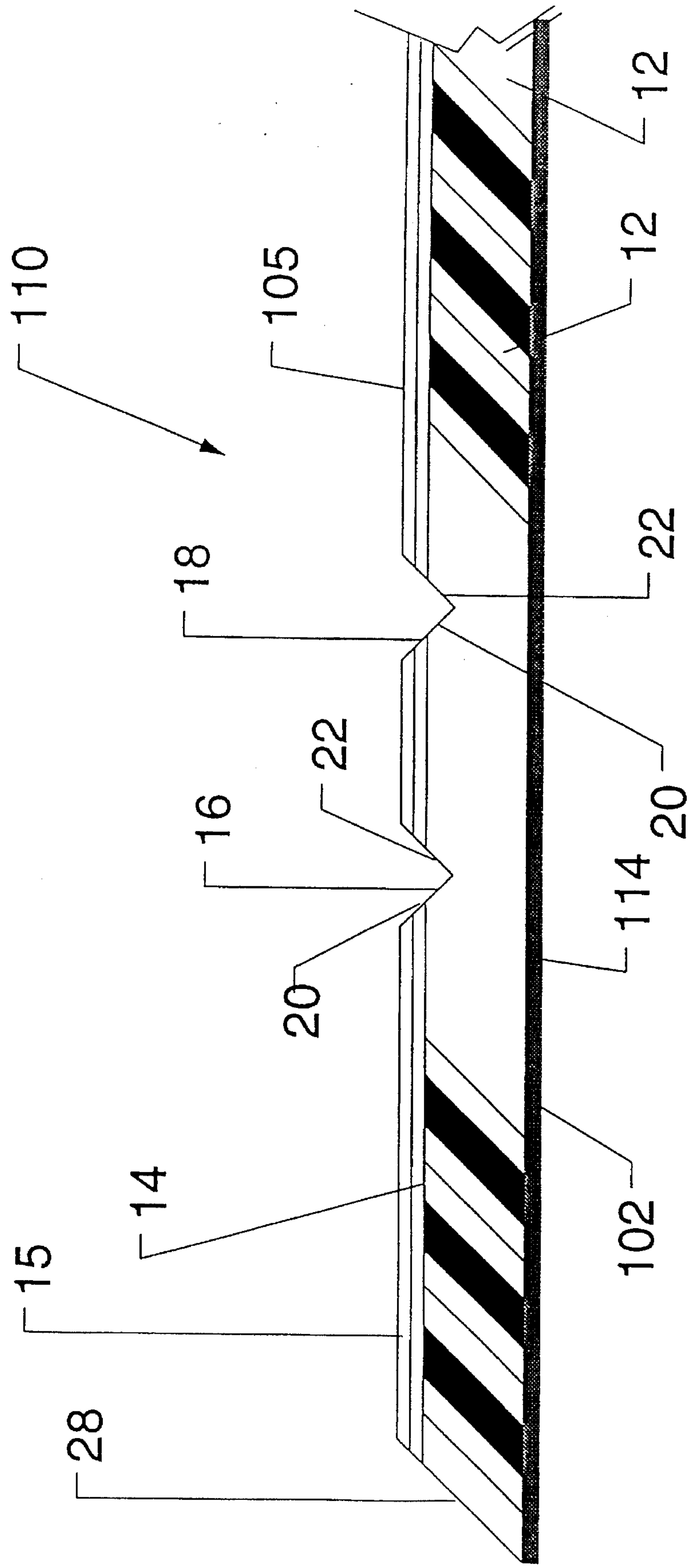
FIG. 11 is a fragmentary side cross section view through a portion of a light conduit and coating layers of a display structure showing a light diffuser panel with a prismatic pattern applied over the backside of the light conduit for imparting a prismatic pattern to light passing through the grooves or alternatively an electro-luminescent source applied to or adjacent to the backside of the light conduit to supply ambient light.

A different aesthetic effect is achieved by the design panel structure 110 of FIG. 11. The design panel 110 is similar in construction to the design panel of FIG. 1 and again corresponding elements are indicated by the same reference numerals. In addition, however, a light diffuser panel 112 is applied to the side 102 opposite the reflective layer of design panel structure 110. The light diffuser panel 112 may be similar to a fluorescent light diffuser panel with a pattern of parallel prisms 114 formed across the surface of the light diffuser panel 112. As a result, when viewed from the grooved side 105 of design panel structure 110, light passing through the grooves appears to be patterned by the pattern of prisms 114, adding an additional patterned appearance to the design.

FIG. 11 may also be modified so that instead of using layer 114 as a patterning device it may be a bonded or closely proximate electro-luminescent source of ambient light. In such event, appropriate electrodes attached to the source and connected in an appropriate circuit will supply ambient light needed to permit the light conduit 12 to capture light to energize the display.

A lampshade 120 bearing a design panel area according to the invention is illustrated in FIG. 12. In the example of FIG. 12, lampshade 120 consists of four trapezoidal display panels 122, each constructed in the same manner as the design panel structures 10 illustrated in FIGS. 1,2 or 3. Each of the panels 122 is formed with a display such as alphanumeric, graphics, or other design as heretofore described. A lamp bulb from a lamp which supports the shade provides ambient artificial light through the interior or uncoated and ungrooved back sides into the light conduits provided by the respective fluorescent plastic display panels 122. Light concentrated within the light conduits is then intercepted by grooves of the display patterns in the respective panels, which grooves refract a portion of the light out of the light conduits and illuminate the grooves, giving the neon light appearance to the respective displays on the lampshade panels 122.

Figure 13:
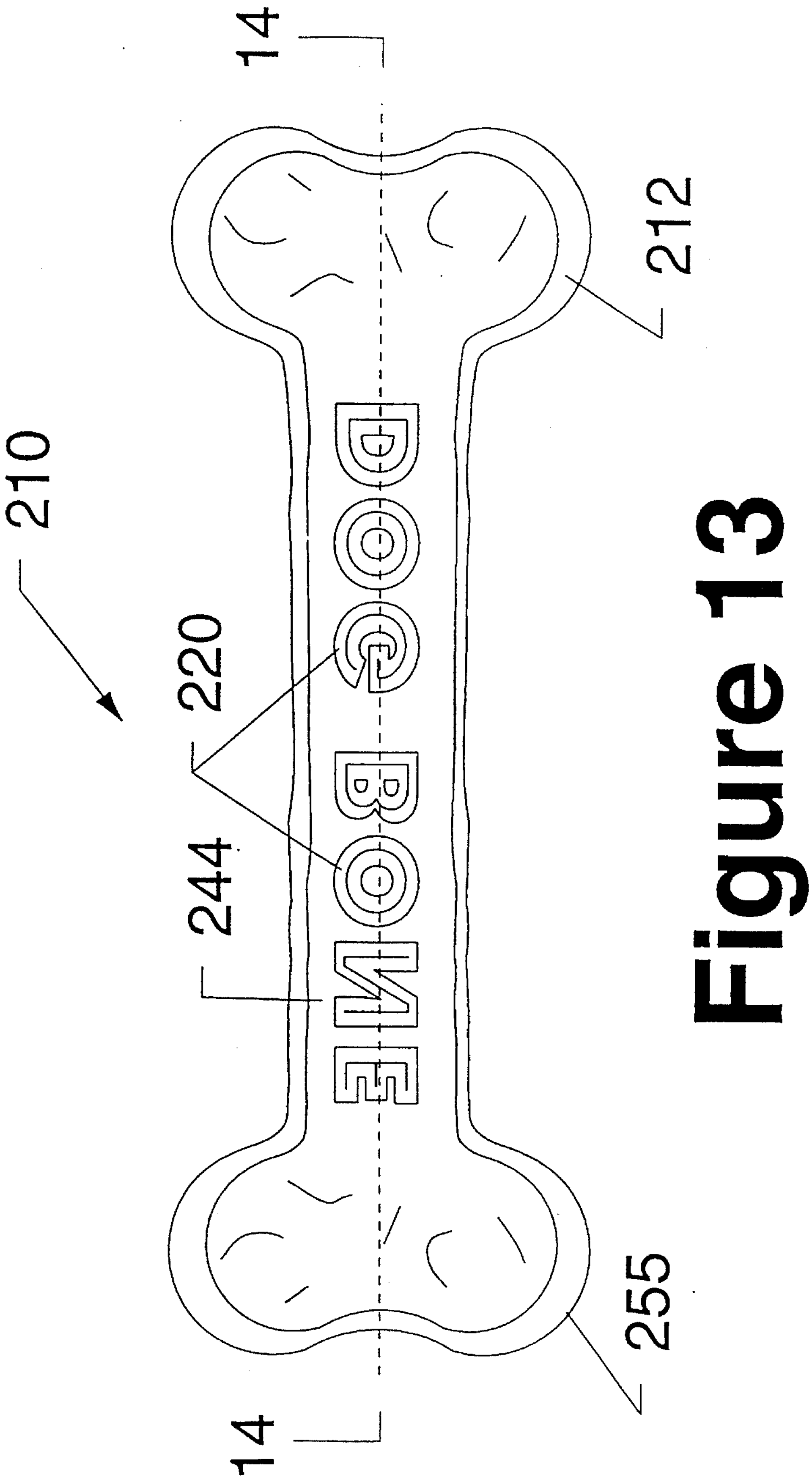
FIG. 13 illustrates an injection molded display in a box form from the rear open side of the box.
Figure 14:
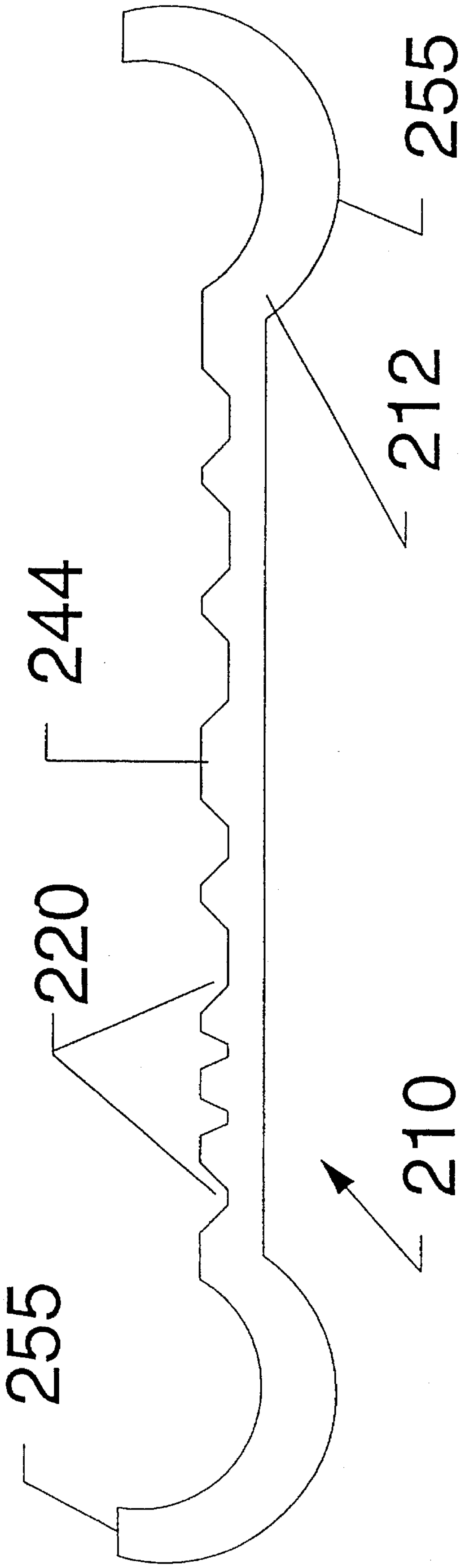
FIG. 14 is a sectional view taken along line 14—14 of FIG. 13.
Figure 15:
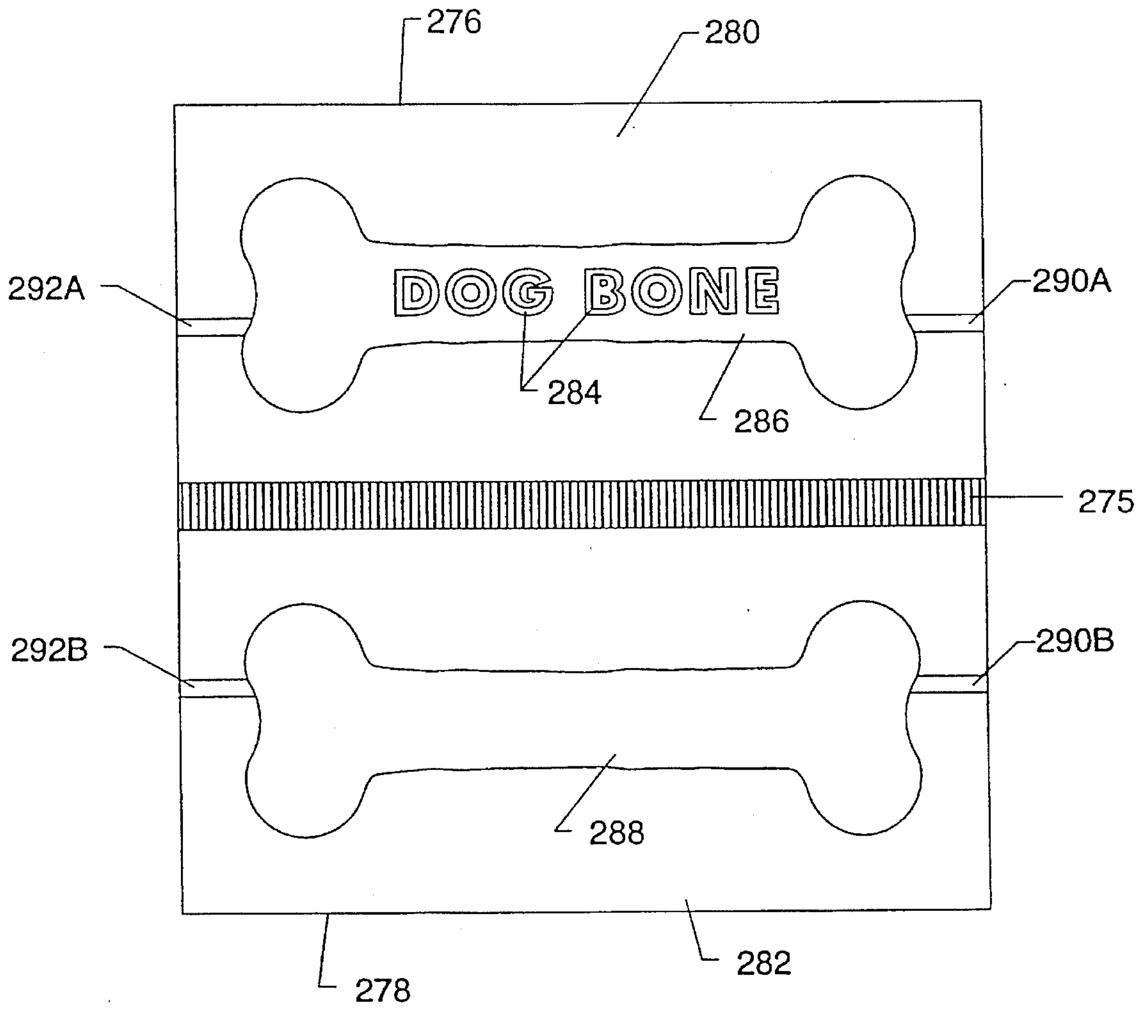
FIG. 15 shows an injection molding mold for the display of FIGS. 13 and 14 in plan view with the mold halves open following removal of the molded display.

Instead of constructing displays of the present invention from fluorescent plastic sheet, signs or displays may be made of tinted fluorescent plastic by injecting such plastic, such as acrylic or crystal styne, into an appropriate mold, such as that shown in FIG. 15. A three-dimensional molded box sign is seen in FIGS. 13 and 14. The molded structure has the advantage that its walls can be of any shape and not limited to a flat sheet or combinations of flat and simple curved walls, such as shown at FIG. 7. In the structure of FIGS. 13 and 14 many of the curves are compound, and the sidewall is continuous around the entire structure and part of the display area 244. The grooves 220 forming the display may be cut into the display or preferably molded into the display during the injection molding process. The grooves may be V-shaped or curved, including semi-circular. The structure must be large enough to accommodate the display. However, area requirements are somewhat different in view of non-flat surfaces. Molding allows variable thickness, but it is preferred to keep the sign as uniform in thickness and the surfaces as parallel to one another as possible in order to provide internal reflection properties uniformly throughout the display in the unitary structure, including the sidewalls.

The display is preferably provided with walls providing a light conduit. Over most regions the light conduit will perform best with walls of uniform thickness and without sharp angled turns, such as square corners more necessary in structures made from sheet material. The display grooves 220 operate on the same criteria. They must be sufficiently deep for their sidewalls to interrupt enough of the captured light within the light conduit to provide desired illumination of the angled walls of the grooves. The walls must also be thick enough to provide structural support. Where the compound curves are employed they will tend to provide strengthening of the walls 212 and 244 so that the walls can be made even thinner than they could with sheet material. The internal reflective properties of the molded light conduit and its ability to capture sufficient light becomes the more important consideration. In a structure like that of FIGS. 13 and 14 beveled edges will probably find little use, but design framing using grooves will be an effective alternative for many types of displays. The great advantage achieved by molding displays according to the present invention is large volume production, making such products very affordable even in complex shapes.

It will be understood that the reflective coating will be applied to the structure, ordinarily on the outside walls of the box essentially as described heretofore except the surfaces will not be flat. Similarly a decorative layer may be applied and will usually be applied for the decorative effect over the outside of the reflective coating. Assuming that a design display has been molded into the outer surface in the course of the injection molding process, the reflective coating and the decorative coating must be carefully applied to avoid flowing into the grooves and obstructing light being refracted out through the angled walls of the grooves, just as in previously described displays. To be effective the grooved areas need to be completely free of any kind of obstruction. Alternatively, of course, instead of molding the design, the design can be cut or routed into either the inside or the outside surface. In the example mentioned, the design grooves are on the outside surface, the coatings may be applied first and the grooves cut through the coatings as in prior examples. It is also possible, of course, to have the reverse effect. That is, applying the coating over the inside and having the grooves cut from the inside of the display area wall. The grooves can also be molded into either the inside or outside walls.

The structure of FIGS. 13 and 14 is, in fact, the less usual situation where grooves are formed in the inside wall. The sign will then be viewed from the outside with the reflective coating on the inside wall around the grooves. As previously explained in this situation, light intercepted by the angled walls of the grooves will be refracted out and the angled wall illuminated. The lighted walls also reflect back through the light conduit and are seen in proper orientation to be understood. In addition, some of the light diffuses inside the light conduit and produces a glow around the illuminated letters.

In fact, any of the coating effects or the coloring or patterning effects mentioned in prior examples can be applied to this type of structure.

FIG. 15 is intended to represent a mold for the display structure of FIGS. 13 and 14. The mold consists of two opposed and cooperating pieces 276 and 278. For simplicity in this showing, a hinge 275 is shown connecting the two pieces together. A hinge would in effect allow the pieces to be rotated into proper position relative to one another and then clamped by appropriate means to hold them in place during the molding process. As a practical matter in most applications a hinge would not be used, but the pieces would be separate and structure supplied, which would move them towards and away from each other and hold them clamped together in the molding process. Much of the areas of the pieces 276 and 278 are flat or sometimes innerfitting surfaces which are brought together and held in place during the molding process so that the fluorescent plastic material used will not be able to flow between them during the molding process. Since in the embodiment shown the grooves are formed on the inside of the sign, the design in the form of the bas relief elements 284 are placed on the top of the convex and die portion which protrudes above the plane of the flat surface 280 of die portion 276. Die plate 278 on the contrary has a concave area 288 shaped like the outside of the box structure 210. When the die pieces are moved together and the flat surfaces 282 meet, the convex portion 286 and the concave portion 288 will be positioned opposite one another in accordance with the design with close to uniform spacing. For most purposes, it is desirable to keep the thickness essentially uniform to provide a functional light conduit. To that end the tool and die maker has the task of forming the spaced apart cooperating pieces 186 and 288 of the mold such that uniform thickness, or near uniform thickness, will be achieved. Thus, making the die is a difficult and expensive task, but, once made, the die can be reused continually to turn out pieces in very rapid succession. The design, of course, will be penetrating into the space between the two pieces to form the display grooves. As the fluid fluorescent plastic is fed through ducts formed by grooves 290*a* and 290*b* into the die space, vents formed by grooves 292*a* and 292*b* at the opposite end of the structure will vent the air from between the plates and allow the plastic to flow in and fill the entire space. It will be understood that FIG. 15 is highly schematic and practical dies may use a number of feed ducts and a number of vents in different appropriate places to allow an efficient flow of fluorescent plastic into the mold. The plastic hardens either naturally in some predetermined manner or is subjected to cooling to aid in such hardening. When the light conduit 210 is fully molded and hardened, the die pieces 276 and 278 are separated, the molded plastic light conduit is removed from the die cavity, excess plastic material cut away and the piece finished as necessary.

It will be noted that the light conduit box of FIGS. 13 and 14 has one side open. That side may be closed by an opaque wall of suitable size and shape and a source of artificial ambient light placed within the closed structure as described in connection with other embodiments above.

It is also possible to form a complete structure by blow molding, although the uniformity of thickness may be more difficult to control. Blow molding allows essentially the structure shown in FIGS. 13 and 14, for example, and a back member to be fabricated at one time. The problem that one normally encounters in such an operation is difficulty in keeping the molded structure uniform in thickness. All sorts of injection, blow molding and other types of molding processes may be employed in appropriate circumstances in order to minimize additional fabrication steps where large numbers of the identical structure are to be made. In some cases the design may not be molded, but may be cut into the structure. Alternatively, the design may be molded, but the part that is molded may be formed of a separate insert to fit within the die so that the design or a particular shape of display may be changed at will within the limits of the provisions made for the insert. The insert would, in many cases, be a plate with raised design portions intended to form the design element grooves, such as letters and numbers as well as other design elements into a given display.

Other molding techniques and the techniques for placing the design, such as an alphanumeric sign display on one side or the other, will be readily known and understood by those skilled in the art.

Bendable and foldable plastics can also be used either by sheet or by molding. Light conducting layers of PVC or K-resin for example can be used as displays on thinner layers and bended or folded in curved configurations. Thin layers, for example, of 1/16 inch (0.16 cm) and less can be used. Soft plastics also can be used for the light conducting layer of decorative objects.

The light conduit can also be combined with an electro-luminescent panel, as a source of ambient light. Light from the electro-luminescent panel is captured in the light conduit and refracted out at the angled surfaces of the display picture. The light conduit may be regarded as one layer, the reflective and decorative coatings additional layers, and an electro-luminescent panel can be applied to the light conduit as an additional adjacent layer.

By molding displays in soft plastics, such as polyethylene, with the same fluorescent characteristics and using electro-luminescent lighting, the invention can be used on articles of clothing such as hats, jackets, shoes, belts and helmets creating a highly visible light source as a warning device quickly identifying people or objects at night (or in fog or smoke). Hard or soft plastic displays can be used on bikes or cars. Such objects supply excellent safety characteristics because of the very bright and unusual light.

While the invention has been described with reference to particular embodiments as examples, it also has many other applications and uses. For example the design structures according to the present invention can be manufactured in the configuration of various commercial articles other than display and as purely ornamental devices. The invention is applicable for radio cases passing light through grooves forming indicia, calibration lines and other design elements. A similar application is for clock faces, using grooves to provide grooved numerical indicia, calibrating lines and ornamental designs appropriate to a clock face.

Other applications include flashlight covers, nameplates, Christmas decorations, mobiles, bicycle decorations, key-chain trinkets, house names, nameplates, etc. Highway applications include directional signs, warning signs, stop lights, exit signs, etc. Another application includes navigational buoys for ships at sea as well as mooring buoys to facilitate identification by the owner. For mooring buoys remote controlled artificial lighting can be provided for nighttime buoy pickup. There are numerous other applications for the signs of the present invention including mens' and ladies' room signs, no smoking signs, etc. The invention is therefore intended to cover all modifications and equivalents within the scope of the following claims.

I claim:

1. A sign for selected alphanumeric or graphic sign display comprising:

a first translucent fluorescent plastic sheet (FPS) having a thickness sufficient for conducting light along the plane of the FPS;

a reflective layer formed on one side of the FPS, said reflective layer being substantially opaque;

a decorative layer formed over the reflective layer selected to provide a desired sign decor;

grooves formed in the FPS in the pattern of the selected alphanumeric or graphic sign display, said grooves being formed in the FPS through said decorative and reflective layers and penetrating into the FPS in the range of 25% to 75% of the thickness of the FPS;

said grooves comprising angled surfaces forming angles between parallel and perpendicular angles to the FPS so that the FPS conducts ambient natural or artificial light along the plane of the FPS and concentrates and transmits light at the angled surfaces for illuminating the selected alphanumeric or graphic sign display;

said alphanumeric or graphic sign display being formed by the angled surfaces in the translucent FPS.

2. The sign of claim 1 wherein the grooves formed in the FPS are V shaped in cross section.

3. The sign of claim 1 wherein the grooves formed in the FPS are substantially semicircular in cross section.

4. The sign of claim 1 wherein the edges of the fluorescent plastic sheet are formed with a bevel angle edge, said bevel angle edge being illuminated by ambient natural or artificial light captured and conducted along the plane of the FPS and concentrated and transmitted at the bevel angle edge.

5. The sign of claim 1 further comprising second, third, fourth, and fifth panels, at least some of said panels being constructed from fluorescent plastic sheets formed with a reflective layer on one side of the FPS and a decorative layer formed over the reflective layer;

said second, third, fourth, and fifth panels being constructed and assembled with the sign to form a rectangular box, said reflective and decorative layers of the FPS panels facing the outside of the box, said box being open on one side of the box for capturing ambient natural or artificial light for conducting light along the planes of the respective panels.

6. The sign of claim 5 comprising a sixth panel constructed and assembled to close the elongated rectangular box;

and a source of artificial lighting housed in said box for generating light to be transmitted along the planes of the FPS panels and for concentrating and transmitting light at the angled surfaces of the grooves.

7. The sign of claim 1 wherein the grooves formed in the FPS penetrate into the FPS in the preferred range of 50% to 75% of the thickness of the FPS.

8. The sign of claim 1 comprising first and second signs constructed as set forth in claim 1, said signs being arranged back to back and being spaced apart from each other;

and spacing means for spacing the signs apart while capturing ambient natural or artificial light between the signs.

9. The sign of claim 8 wherein the first and second signs are positioned with the grooves facing outward for concentrating and transmitting light at the angled surfaces of the grooves for illuminating the selected alphanumeric or graphic sign display.

10. The sign of claim 8 wherein the first and second signs are positioned with the grooves facing inward and so that light is received and transmitted at the grooves and refracted through the thickness of the FPS forming a halo effect around the selected illuminated alphanumeric or graphic sign display.

11. The sign of claim 1 further comprising a clear polymer layer formed over the decorative layer and filling the grooves to form a substantially smooth surface, said clear polymer layer introducing a halo effect from light concentrated and transmitted through the angled surfaces of the grooves and refracted through the clear polymer layer.

12. The sign of claim 1 further comprising an enclosure joining the sign at the edges of the sign, said enclosure being formed with appropriate sign decor;

and a source of artificial lighting housed within the enclosure for generating artificial light transmitted along the plane of the FPS for intensifying and transmitting light through the angled surfaces of the grooves.

13. The sign of claim 1 further comprising a partial layer of translucent tinted polymer formed on the backside of the FPS opposite the grooves over a selected portion only of the alphanumeric or graphic sign display to provide a multicolor sign when viewed from the groove side of the sign.

14. The sign of claim 1 further comprising a light diffuser panel having a prismatic pattern bonded to the backside of the FPS opposite the grooves for imparting the prismatic pattern to light passing through the grooves.

15. The sign of claim 1 wherein the reflective layer is a substantially opaque white layer, wherein the other side of the fluorescent plastic sheet opposite the reflective layer and decorative layer is exposed, and wherein the sign is positioned so that the exposed side of the fluorescent plastic sheet faces viewers, thereby forming a halo effect of light concentrated and transmitted through the angled surfaces of the grooves and refracted through the thickness of the fluorescent plastic sheet.

16. A sign for selected alphanumeric or graphic sign display comprising:

a first translucent fluorescent plastic sheet (FPS) having a thickness selected for conducting light along the plane of the FPS;

a reflective layer formed on one side of the FPS, said reflective layer being substantially opaque;

grooves formed in the FPS in the pattern of the selected alphanumeric or graphic sign display, said grooves being formed in the FPS through said reflective layer and substantially penetrating into the FPS;

said grooves comprising angled surfaces forming angles between parallel and perpendicular angles to the FPS so that the FPS conducts ambient natural or artificial light along the plane of the FPS and concentrates and transmits light at the angled surfaces for illuminating the selected alphanumeric or graphic sign display;

said alphanumeric or graphic sign display being formed by the angled surfaces in the translucent FPS.

17. The sign of claim 16 wherein the grooves formed in the FPS are V shaped in cross section.

18. The sign of claim 16 wherein the grooves formed in the FPS are substantially semicircular in cross section.

19. The sign of claim 16 wherein the edges of the fluorescent plastic sheet are formed with a bevel angle edge, said bevel angle edge being illuminated by ambient natural or artificial light captured and conducted along the plane of the FPS, and concentrated and transmitted at the bevel angle edge.

20. The sign of claim 16 further comprising second, third, fourth, and fifth panels, at least some of said panels being constructed from fluorescent plastic sheets formed with a reflective layer on one side of the FPS;

said second, third, fourth, and fifth panels being constructed and assembled with the sign to form a rectangular box, said reflective layer of the FPS panels facing the outside of the box, said box being open on one side for capturing ambient natural or artificial light or illuminating the selected alphanumeric or graphic sign display.

21. The sign of claim 20 comprising a sixth-panel constructed and assembled to close the elongate rectangular box;

and a source of artificial lighting housed in said box for generating light to be transmitted along the planes of the FPS panels and for concentrating and transmitting light at the angled surfaces of the grooves.

22. The sign of claim 16 further comprising a decorative layer formed over the reflective layer according to the design decor, and a clear polymer layer formed over the decorative layer and filling the grooves to form a substantially smooth surface, said clear polymer layer introducing a halo effect from light concentrated and transmitted through the angled surfaces of the grooves and refracted through the clear polymer layer.

23. The sign of claim 16 wherein the reflective layer is a substantially opaque white layer, wherein the other side of the fluorescent plastic sheet opposite the reflective layer is exposed, and wherein the sign is positioned so that the exposed side of the fluorescent plastic sheet faces viewers, thereby forming a halo effect of light concentrated and transmitted through the angled surfaces of the grooves and refracted through the thickness of the fluorescent plastic sheet.

24. The sign of claim 16 comprising a decorative layer formed over the reflective layer and selected to provide a desired sign decor, said grooves being formed through the decorative layer and reflective layer.

25. The sign of claim 16 wherein the thickness of the FPS is selected to be in the preferred range of ⅛" (3.1 mm) to ½" (1.25 mm).

26. The sign of claim 25 wherein the grooves penetrate into the FPS in the range of 25% to 75% of the thickness of the FPS.

27. A method for constructing a sign for selected alphanumeric or graphic sign display comprising:

forming a first translucent fluorescent plastic sheet (FPS) with a thickness selected for conducting light along the plane of the FPS;

coating a reflective layer on one side of the FPS, said reflective layer being substantially opaque; coating a decorative layer over the reflective layer;

forming grooves in the FPS in the pattern of the selected alphanumeric or graphic sign display, said grooves being formed in the FPS through said decorative layer and reflective layer and substantially penetrating into the FPS; and forming said grooves with angled surfaces in the translucent FPS forming angles between parallel and perpendicular angles to the FPS so that the FPS conducts ambient natural or artificial light along the plane of the FPS and concentrates and transmits light at the angled surfaces for illuminating the selected alphanumeric or graphic sign display.

28. The method of claim 27 wherein the grooves formed in the FPS are V shaped in cross section.

29. The method of claim 27 wherein the grooves formed in the FPS are substantially semicircular in cross section.

30. The method of claim 27 comprising forming the edges of the fluorescent-plastic sheet with a bevel angle edge, said bevel angle edge being illuminated by ambient natural or artificial light captured and conducted along the plane of the FPS, and concentrated and transmitted at the bevel angle edge.

31. The method of claim 27 further comprising coating a clear polymer layer over the decorative layer and filling the grooves to form a substantially smooth surface, said clear polymer layer introducing a halo effect from light concentrated and transmitted through the angled surfaces of the grooves and refracted through the clear polymer layer.

32. The method of claim 27 comprising exposing the other side of the fluorescent plastic sheet from the decorative layer and reflective layer and positioning the sign so that the exposed side of the fluorescent plastic sheet faces viewers, thereby forming a halo effect of light concentrated and transmitted through the angled surfaces of the grooves and refracted through the thickness of the fluorescent plastic sheet.

33. The method of claim 27 comprising forming the grooves so that the grooves penetrate into the FPS in the range of 25% to 75% of the thickness of the FPS.

34. The method of claim 33 comprising forming the grooves so that the grooves penetrate into approximately 50% of the thickness of the FPS.

35. The method of claim 27 comprising coating a partial layer of translucent tinted polymer on the backside of the FPS opposite the grooves and over only a selected portion of the alphanumeric or graphic sign display to provide a multicolor sign.

36. A display comprising:

a translucent fluorescent plastic light conduit having a thickness to permit capturing, conducting and confining ambient natural or artificial light within the thickness of the light conduit;

a substantially opaque reflective layer formed on one side of the light conduit;

grooves formed in the light conduit in the pattern of the display, said grooves being formed in the light conduit through said substantially opaque layer and penetrating into the light conduit at least sufficiently far that angled surfaces of the grooves intercept ambient natural or artificial light captured within and conducted along the thickness of the light conduit and refract out of the light conduit light visible at the angled surfaces to illuminate the display.

37. The display of claim 36 wherein a decorative layer formed over the substantially opaque reflective layer is selected to provide a desired display decor.

38. The display of claim 36 wherein the grooves formed in the light conduit are V shaped in cross section.

39. The display of claim 36 wherein the grooves formed in the light conduit are curved in cross section.

40. The display of claim 36 wherein at least one edge of the light conduit is formed to have at least some parts of the edge at such an angle that said edge is illuminated by ambient natural or artificial light captured within and conducted along the thickness of the light conduit some of which is refracted out at the at least one edge.

41. The display of claim 40 in which at least one of the edges of the light conduit is beveled to an angle which will refract out of the light conduit some of the captured light so that at least one of the edges will be illuminated.

42. The display of claim 40 in which at least two opposite edges of the light conduit are formed to have at least some part of the edge at such an angle that will refract out of the light conduit some of the captured light so that those respective opposite edges are illuminated.

43. The display of claim 40 in which all edges of the light conduit are formed to have at least some part of the edges at such an angle that will refract out of the light conduit some of the captured light so that the respective edges are illuminated.

44. The display of claim 40 in which all edges of the light conduit are beveled to an angle that will refract out of the light conduit some of the captured light so that the edges are illuminated.

45. The display of claim 36 in which the light conduit is included in a box structure made of at least two panels, at least one of which is the translucent fluorescent plastic light conduit, wherein the box sidewalls comprise at least one panel and the other of the at least two panels is assembled with the sidewalls to form a box, said at least one translucent fluorescent plastic light conduit having an essentially opaque layer formed on a selected side and the grooves providing a box through the reflective layer into the light conduit, said box is open on one side for capturing ambient natural or artificial light within the panel and conducted along the thickness of the at least one panel to illuminate the angled surfaces of the grooves.

46. The display of claim 45 in which a translucent fluorescent light conduit with a reflective coating and groove design is provided in at least one sidewall panel.

47. The display of claim 45 in which a translucent fluorescent light conduit with a reflective coating and groove design is provided by the panel to which the sidewall is attached.

48. The display of claim 46 in which a translucent fluorescent light conduit with a reflective coating and groove design is provided in the panel to which the sidewall is attached in addition to at least:one sidewall panel.

49. The display of claim 48 in which translucent fluorescent light conduits with a reflective coating and groove design are provided in more than one sidewall panel.

50. The display of claim 46 in which the opaque layer is placed on the light conduit on the inside of the box.

51. The display of claim 46 in which the opaque layer is placed on the light conduit on the outside of the box.

52. The display of claim 45 wherein a first panel is essentially flat and has a plurality of straight edges and the box sidewalls comprise a plurality of panels having straight edges with the straight edges attached together and to the first panel.

53. The display of claim 52 wherein one or more of the sidewall panels may be a light conduit panel and provided with an opaque layer and a grooved surface for a display.

54. The display of claim 45 wherein a first panel is an essentially flat fluorescent plastic light conduit and the sidewalls are formed at least in part by a single sheet bent to conform generally to the shape of the edges of the first panel and fixed along the edges of the first panel to conform generally to the shape of the edges of the first panel.

55. The display of claim 54 wherein the sidewalls are made of one continuous sheet.

56. The display of claim 55 wherein the sidewalls are composed of a fluorescent plastic light conduit and provided with an opaque layer and a grooved surface for a display.

57. The display of claim 45 wherein a closure panel is assembled to the sidewalls to close the box;

and a source of artificial lighting is housed in said box for generating light captured and transmitted within the thickness of the light conduit panel, some of which light is refracted out at the angled surfaces of grooves within the first panel.

58. The display of claim 36 wherein the grooves penetrate into the light conduit a distance in the range of 25% to 75% of the thickness of the light conduit.

59. The display of claim 36 in which the light conduit is included in a box structure made of a molded translucent fluorescent plastic light conduit wherein at least a part of one side of the light conduit has formed on it an essentially opaque layer and grooves providing a design formed in the light conduit extending through the reflective layer sufficiently far for their angled walls to intercept and be illuminated by the captured light.

60. The display of claim 59 in which the opaque layer is placed on the outside of the light conduit box so that light intercepted by the grooves is seen only within the grooves.

61. The display of claim 59 in which the opaque layer is placed on the inside of the light conduit box so that light intercepted by the grooves is seen as light from the grooves and also as a diffused halo with the conduit surrounding the grooves.

62. A display structure comprising first and second light conduit displays constructed as set forth in claim 36, said displays being arranged back to back and being spaced apart from each other;

and spacing means for spacing the displays apart sufficiently to permit capturing ambient natural or artificial light between the displays.

63. The display structure of claim 62 wherein the first and second displays are positioned with the grooves facing outwardly.

64. The display structure of claim 62 wherein the first and second displays are positioned with the grooves opening inwardly and so that light is intercepted, refracted and displayed at the angled surfaces of the grooves and also diffused back through the respective light conduits forming a halo effect around the illuminated display.

65. The display of claim 36 wherein the display is positioned with the grooves opening inwardly so that light is intercepted, refracted and displayed at the angled surfaces of the grooves and also diffused back through the light conduit forming a halo effect around the illuminated display.

66. The display of claim 36 further comprising a clear polymer layer formed over the substantially opaque reflective layer and filling the grooves to form a substantially smooth surface, said clear polymer layer introducing a halo effect from light from the angled surfaces intercepted and diffused through the clear polymer layer.

67. The display of claim 36 further comprising an enclosure joining the display at the edges of the display;

and a source of artificial lighting housed within the enclosure for generating artificial light to be captured within and transmitted along the thickness of the light conduit for intercepting, refracting and displaying light at the angled surfaces of the grooves.

68. The display of claim 36 further comprising a layer of translucent tinted polymer formed on a portion of the face of the light conduit opposite the grooves over a selected portion only of the display to provide a multicolor display when viewed from the groove side of the display.

69. The display of claim 68 wherein the layer of translucent tinted polymer includes various tinted polymers in different selected areas to provide different color to various areas of the display.

70. The display of claim 36 further comprising a light diffuser panel having a prismatic pattern bonded to the face of the light conduit opposite the grooves for imparting the prismatic pattern to light passing through the grooves.

71. The display of claim 36 wherein the reflective layer is a substantially opaque white layer, wherein the other side of the light conduit opposite the reflective layer is exposed, and wherein the display is positioned so that the exposed side of the light conduit away from the reflective layer faces viewers, thereby forming a halo effect of diffused light refracted back into the thickness of the light conduit.

72. A method for constructing a display comprising:

forming a translucent fluorescent plastic light conduit having a thickness to permit capturing, conducting and concentrating ambient natural or artificial light within the thickness of the light conduit;

coating a substantially opaque reflective layer onto one side of the light conduit;

cutting grooves in the light conduit in the pattern of the display, said grooves being cut in the light conduit through said substantially opaque layer and penetrating into the light conduit at least sufficiently far that angled surfaces of the grooves intercept light captured within and conducted along the thickness of the light conduit and refract out of the light conduit light visible at the angled surfaces to illuminate the display.

73. A method for constructing a display comprising:

forming a translucent fluorescent plastic light conduit having a thickness to permit capturing, conducting and concentrating ambient natural or artificial light within the thickness of the light conduit;

forming grooves in the light conduit in the pattern of the display;

coating a substantially opaque reflective layer onto that side of the light conduit in which grooves are formed while avoiding putting the reflective layer into the grooves;

wherein the grooves penetrate into the light conduit at least sufficiently far that angled surfaces of the grooves intercept light captured within and conducted along the thickness of the light conduit and refract out of the light conduit light visible at the angled surfaces to illuminate the display.

74. The method of claim 72 in which the light conduit is produced by injection molding.

75. The method of claim 72 wherein a decorative layer is applied over the essentially opaque reflective layer before forming grooves in the light conduit.

76. The method of claim 72 wherein the grooves formed in the light conduit are V shaped in cross-section.

77. The method of claim 72 wherein the grooves formed in the light conduit are substantially curved in cross section.

78. The method of claim 72 comprising forming at least one of the edges of the light conduit to have at least some parts of the edge at such an angle that some light is refracted out of the light conduit and said edge is thereby illuminated by ambient natural or artificial light captured within and conducted along the thickness of the light conduit.

79. The method of claim 72 further comprising coating a clear polymer layer over the decorative layer and filling the grooves in the light conduit to form a substantially smooth surface, said clear polymer layer introducing a halo effect from light at the angled surfaces of the grooves and diffused through the clear polymer layer.

80. The method of claim 72 comprising displaying the other side of the light conduit from the substantially opaque reflective layer whereby refracted light passes out of the light conduit and illuminates the grooves at the angled surfaces so that part of that light is reflected back through the light conduit and part of it is diffused through the thickness of the light conduit to produce a halo effect.

81. The method of claim 72 comprising forming the grooves so that the grooves penetrate into the light conduit in the range of 25% to 75% of the thickness of the light conduit.

82. The method of claim 72 comprising coating on limited discrete areas of the backside of the light conduit opposite the grooves with various colors of translucent polymer to provide a multicolor sign.

83. A display comprising a first translucent fluorescent plastic sheet (FPS) having a thickness sufficient to capture ambient light and confine it within the thickness of the FPS;

a substantially opaque layer formed on one side of the FPS;

grooves formed in the FPS in the pattern of the selected display, said grooves being formed through the substantially opaque layer and penetrating into the FPS sufficiently to intercept light captured within the thickness of the FPS;

the grooves providing surfaces angled within the FPS so that ambient or artificial light captured within the FPS and transmitted along the thickness of the FPS impinges on and passes through the angled surfaces and thereby illuminates the display formed by the angled surfaces within the translucent FPS.

84. The method of forming a display comprising molding translucent fluorescent plastic material into a unitary light conduit structure having a thickness sufficient to permit capture and conduction of ambient light within the thickness of the light conduit;

providing a substantially opaque reflective layer on one side of the light conduit;

forming grooves in the light conduit in the pattern of the display through said substantially opaque reflective layer and penetrating into the light conduit sufficiently to intercept light within the light conduit and refract some of that intercepted light out of the light conduit, said grooves providing angled surfaces so that refracted light thereby illuminates the display at the angled surfaces within the translucent FPS.

85. The method of claim 84 in which the grooves are formed by cutting them through the substantially opaque reflective layer.

86. The method of forming a display comprising molding translucent fluorescent plastic material into a unitary light conduit structure having a thickness sufficient to permit capture and conduction of ambient light within the thickness of the light conduit;

forming grooves in the light conduit in the pattern of the display penetrating into the light conduit sufficiently to intercept light within the light conduit and refract some intercepted light out of the light conduit, said grooves providing angled surfaces so that captured light thereby illuminates the display at the angled surfaces within the light conduit said grooves being formed by molding them into the unitary light conduit structure as that structure is molded in the pattern of the display using a suitable mold pattern which creates grooves providing angled surfaces so that captured light therein illuminates the display at the angled surfaces within the light conduit; and providing a substantially opaque reflective layer on the grooved side of the light conduit while avoiding getting the substantially opaque reflective layer into the grooves.

87. The method of claim 84 of molding translucent plastic material using hard plastics.

88. The method of claim 84 of molding translucent plastic material Using bendable plastics.

89. The method of claim 84 of molding translucent plastic material using soft plastics.

90. The display of claim 36 wherein electro-luminescent lighting is employed as an artificial ambient light source.

91. The display of claim 90 in which the electro-luminescent light source is applied as a layer to the light conduit to the side opposite the reflective layer.

92. The display of claim 36 in combination with a light source supported in fixed position relative to one another to take advantage of and maintain the best position of the light source for display effect.

* * * * *